(12) United States Patent
Ryu et al.

(10) Patent No.: US 12,543,305 B2
(45) Date of Patent: Feb. 3, 2026

(54) MEMORY DEVICE

(71) Applicant: SAMSUNG ELECTRONICS CO., LTD., Suwon-si (KR)

(72) Inventors: Min Tae Ryu, Suwon-si (KR); Byong-Deok Choi, Seoul (KR); Sungwon Yoo, Suwon-si (KR); Wonsok Lee, Suwon-si (KR); Yongsang Yoo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 158 days.

(21) Appl. No.: 18/240,516

(22) Filed: Aug. 31, 2023

(65) Prior Publication Data
US 2024/0292600 A1 Aug. 29, 2024

(30) Foreign Application Priority Data
Feb. 23, 2023 (KR) .................. 10-2023-0024393

(51) Int. Cl.
| | |
|---|---|
| *G11C 7/00* | (2006.01) |
| *G11C 11/4091* | (2006.01) |
| *G11C 11/4094* | (2006.01) |
| *G11C 11/4097* | (2006.01) |
| *H10B 12/00* | (2023.01) |
| *H10D 1/68* | (2025.01) |

(52) U.S. Cl.
CPC ........ *H10B 12/482* (2023.02); *G11C 11/4091* (2013.01); *G11C 11/4094* (2013.01); *G11C 11/4097* (2013.01); *H10B 12/312* (2023.02); *H10B 12/315* (2023.02); *H10B 12/50* (2023.02); *H10D 1/716* (2025.01)

(58) Field of Classification Search
CPC .... H10B 12/482; H10B 12/50; H10B 12/315; H10B 12/312; H10D 1/716; G11C 11/4091; G11C 11/4094; G11C 11/4097
USPC .......................................................... 365/203
See application file for complete search history.

(56) References Cited

U.S. PATENT DOCUMENTS

| | | | | |
|---|---|---|---|---|
| 4,792,922 | A | * 12/1988 | Mimoto | ............... G11C 11/34 |
| | | | | 365/205 |
| 5,079,746 | A | 1/1992 | Sato | |
| 5,353,255 | A | 10/1994 | Komuro | |
| 5,978,250 | A | * 11/1999 | Chung | ............... G11C 11/22 |
| | | | | 365/210.15 |
| 6,097,624 | A | * 8/2000 | Chung | ............... G11C 11/22 |
| | | | | 365/104 |
| 6,130,127 | A | * 10/2000 | Yang | .................. H10D 1/716 |
| | | | | 257/E21.244 |

(Continued)

FOREIGN PATENT DOCUMENTS

| | | | | |
|---|---|---|---|---|
| CN | 103119657 | A * | 5/2013 | ............ G11C 17/16 |
| CN | 118540937 | A * | 8/2024 | ............ H10D 1/711 |

(Continued)

*Primary Examiner* — Viet Q Nguyen
(74) *Attorney, Agent, or Firm* — Muir Patent Law, PLLC

(57) ABSTRACT

A memory device includes a first memory cell connected to a first bitline and a second memory cell connected to a second bitline, wherein the first memory cell may include a first access transistor including one end connected to the first bitline, and a first capacitor including one electrode connected to another end of the first access transistor and another electrode connected to the second bitline, and the first access transistor may include an oxide semiconductor.

12 Claims, 19 Drawing Sheets

(56) References Cited

U.S. PATENT DOCUMENTS

| | | | | |
|---|---|---|---|---|
| 6,810,465 B2* | 10/2004 | Gaither | ............... | G06F 12/0833 |
| | | | | 711/E12.071 |
| 7,443,713 B2 | 10/2008 | Schroder et al. | | |
| 8,809,927 B2 | 8/2014 | Takemura | | |
| 9,552,869 B1* | 1/2017 | Cordero | ................. | G11C 7/062 |
| 12,289,894 B1* | 4/2025 | Dokania | .............. | H10B 12/315 |
| 2004/0085844 A1* | 5/2004 | Arimoto | ............. | G11C 11/4091 |
| | | | | 365/189.011 |
| 2010/0081395 A1* | 4/2010 | Woo | ..................... | H10B 12/315 |
| | | | | 455/73 |
| 2010/0327336 A1* | 12/2010 | Juengling | .............. | H10D 1/042 |
| | | | | 257/306 |
| 2016/0284713 A1* | 9/2016 | Kihara | ................. | G11C 11/412 |
| 2020/0035683 A1* | 1/2020 | Sharma | ............. | H10D 30/6729 |
| 2020/0258561 A1* | 8/2020 | DeVilbiss | ........... | G11C 11/2255 |
| 2020/0286554 A1 | 9/2020 | Uochi et al. | | |

FOREIGN PATENT DOCUMENTS

| | | | | |
|---|---|---|---|---|
| CN | 119993229 A * | 5/2025 | ......... | H10B 12/0335 |
| KR | 102432207 B1 * | 8/2022 | ......... | G11C 11/4085 |

* cited by examiner

MEMORY DEVICE

CROSS-REFERENCE TO RELATED APPLICATION

Korean Patent Application No. 10-2023-0024393 filed in the Korean Intellectual Property Office on Feb. 23, 2023, and entitled "Memory Device" is incorporated herein by reference in its entirety.

BACKGROUND

1. Field

Embodiments of the present disclosure described herein relate to a memory device.

2. Description of the Related Art

A memory device may include a plurality of transistors implemented with silicon semiconductors. Parasitic capacitance between the source/drain regions of the plurality of transistors and a semiconductor substrate on which the plurality of transistors are formed may be very large. Parasitic capacitance may be electrically connected to the bitline to cause a problem of increase in the capacitance of the bitline. In a transistor including a silicon semiconductor, an amount of leakage current may increase as a voltage difference between a source and a drain increases. This may cause a decrease in the retention time of the memory cell. Also, a decrease in retention time may cause a decrease in the operating speed of the memory device and an increase in the power consumption of the memory device.

SUMMARY

Embodiments of the present disclosure provide a memory device capable of reducing parasitic capacitance and improving retention time.

An embodiment of the present invention provides a memory device that may include a first memory cell connected to a first bitline and a second memory cell connected to a second bitline. The first memory cell may include: a first access transistor including one end connected to the first bitline; and a first capacitor including one electrode connected to another end of the first access transistor and another electrode connected to the second bitline. The first access transistor may include an oxide semiconductor.

Another embodiment of the present invention provides a memory device, including: a first oxide semiconductor layer; a first source/drain layer connected to the first oxide semiconductor layer in a first direction; a first bitline extending in a second direction and connected to the first oxide semiconductor layer; a first electrode located on the first source/drain layer and connected to the first source/drain layer; a second electrode forming a first capacitor with the first electrode; and a second bitline extending in the second direction and connected to the second electrode.

Still another embodiment of the present invention provides a memory device including: a first memory cell connected to a first bitline and a second bitline; and a sense amplification circuit connected to the first bitline and the second bitline, and configured to amplify a sense voltage that is a voltage difference between the first bitline and the second bitline. The first memory cell may include: a first access transistor connected to the first bitline; and a first capacitor connected to the second bitline. The first access transistor may include an oxide semiconductor.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
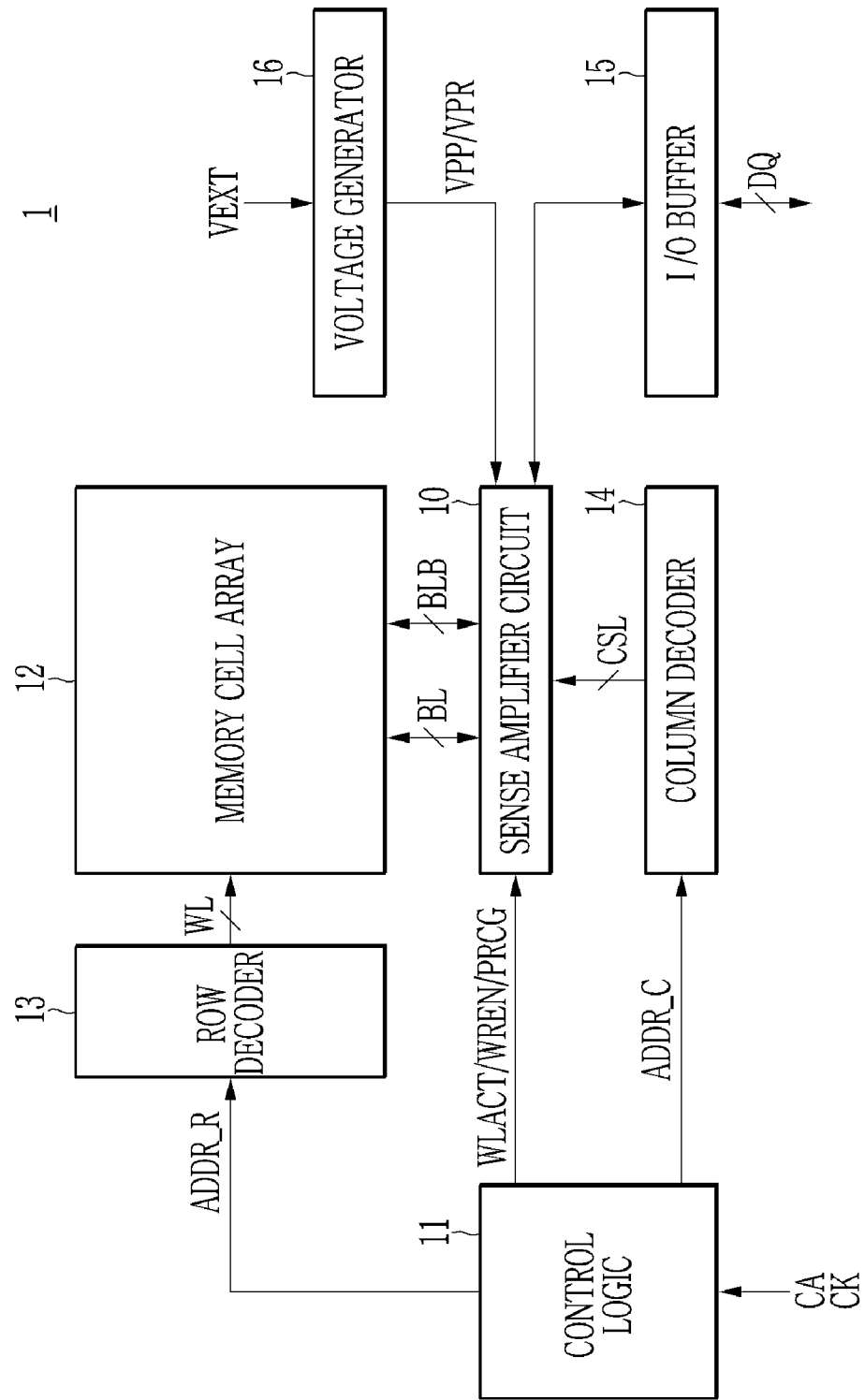
FIG. 1 is a block diagram illustrating an example of a memory device according to an exemplary embodiment.

In the following detailed description, only certain embodiments of the present invention have been illustrated and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification. In flowcharts described with reference to the drawings, the order of operations may be changed, several operations may be merged, some operations may be divided, and specific operations may not be performed.

In addition, expressions written in the singular may be construed in the singular or plural unless an explicit expression such as "a" or "single" is used. Terms including an ordinary number, such as first and second, are used for describing various constituent elements, but the constituent elements are not limited by the terms. These terms may be used for the purpose of distinguishing one component from another.

In the drawings, the thickness of layers, films, panels, regions, etc., are exaggerated for clarity, and the thickness of some layers and regions may be highlighted and illustrated relative to the actual structure. Further, it will be understood that when an element such as a layer, film, region, or substrate is referred to as being "on" another element, it can be directly on the other element or intervening elements may also be present. Terms that indicate positional relationships between configurations, such as "above" or "under," may be applied based on the drawing. However, the positional relationships between configurations are not limited by these terms. Also, throughout the specification, "on" means above or below the target portion and does not necessarily mean on top of relative to the direction of gravity. Further, throughout the entire specification, "a cross-section image", refers to when the cross-section obtained by cutting a target part vertically is viewed from the side.

FIG. 1 is a block diagram illustrating an example of a memory device according to a exemplary embodiment.

Referring to FIG. 1, a memory device 1 may include a control logic 11, a memory cell array 12, a row decoder 13, a column decoder 14, an input/output buffer 15, a voltage generator 16, and a sense amplifier 10. In the exemplary embodiment, the memory device 1 may be implemented as Dynamic Random Access Memory (DRAM).

The control logic 11 may receive a command/address CA and a clock CK from an external device (e.g., a host, CPU, memory controller, or the like) of the memory device 1. The command/address CA may include a command indicating an operation to be performed by the memory device 1, a row address ADDR_R indicating a row of a memory cell (hereinafter, referred to as a targeted memory cell) that is a target of an operation to be performed by the memory device 1, and a column address ADDR_C indicating a column of the targeted memory cell. The control logic 11 may transmit the row address ADDR_R to the row decoder 13 and may transmit the column address ADDR_C to the column decoder 14.

The control logic 11 may decode the received command/address CA. For example, the control logic 11 may include a decoder for decoding the received command/address CA. The control logic 11 may receive one or all of an active command, a read/write command, a precharge command, and the like from the host, and may decode the received commands. The control logic 11 may generate a corresponding signal among a word line active signal WLACT, a write enable signal WREN, a precharge signal PRCG based on a result of the decoding, and transmit the generated signal to the sense amplifier 10. For example, the control logic 11 may generate the word line active signal WLACT in response to the active command, generate the write enable signal WREN in response to the write command, or generate the precharge signal PRCG in response to the precharge command.

The memory cell array 12 may include a plurality of memory cells. For example, each of the memory cells included in the memory cell array 12 may be connected to a corresponding word line among the plurality of word lines WL, a corresponding bitline among the plurality of bitlines BL, and a corresponding complementary bitline among the plurality of complementary bitlines BLB. When the voltage obtained by subtracting the voltage of the complementary bitline BLB from the voltage of the bitline BL is a voltage corresponding to data written to and read from a certain memory cell, the corresponding memory cell is referred to as a 'first memory cell', and when the voltage obtained by subtracting the voltage of the bitline BL from the voltage of the complementary bitline BLB is a voltage corresponding to data written to and read from a certain memory cell, the corresponding memory cell is referred to as a 'second memory cell'.

The bitline BL and the complementary bitline BLB may configure a bitline pair with respect to a plurality of corresponding first memory cells and a plurality of corresponding second memory cells. A storage element of each of the plurality of first memory cells may be connected to a corresponding complementary bitline, and a storage element of each of the plurality of second memory cells may be connected to a corresponding bitline. Each of the plurality of memory cells may be provided in a matrix form. In this case, the plurality of word lines WL may be connected to the rows of the memory cells, and the plurality of bitlines BL and the plurality of complementary bitlines BLB may be connected to the columns of memory cells.

The row decoder 13 may receive the row address ADDR_R from the control logic 11. The row decoder 13 may be connected to the memory cell array 12 through a plurality of word lines WL. The row decoder 13 may select one word line from among the plurality of word lines WL connected to the memory cell array 12 by decoding the received row address ADDR_R. The row decoder 13 may activate the selected word line by applying a voltage to the selected word line.

The column decoder 14 may receive the column address ADDR_C from the control logic 11. The column decoder 14 may be connected to the sense amplifier 10 through a plurality of column select lines CSL. The column decoder 14 may select the bitline(s) and the complementary bitline(s) corresponding to the column address ADDR_C among the plurality of bitlines and the plurality of complementary bitlines BL and BLB connected to the memory cell array 12 by decoding the received column address ADDR_C. The column decoder 14 may select (or activate) the bitline and the complementary bitline by applying an on-level column selection signal to the bitline and the complementary bitline through the column select line CSL.

When the memory device 1 performs a write operation in response to the command/address CA, the input/output buffer 15 may receive data DQ from an external device. The input/output buffer 15 may temporarily store the received data DQ. The input/output buffer 15 may transmit the stored data DQ to the sense amplifier 10.

In response to the command/address CA, when the memory device 1 performs a read operation, the input/output buffer 15 may receive data sensed by the sense amplifier 10 and stored in the memory cell array 12 and temporarily store the received data. The data temporarily stored in the input/output buffer 15 and stored in the memory cell array 12 may be output to an external device in response to a request from the external device.

The voltage generator 16 may generate various voltages that may be used within the memory device 1. For example, the voltage generator 16 may receive an external voltage VEXT from an external device of the memory device 1. The voltage generator 16 may generate various voltages necessary for driving the memory device 1 based on the external voltage VEXT. For example, the voltage generator 16 may provide a power supply voltage VPP, a precharge voltage VPR, and the like necessary for the operation of the sense amplifier 10.

The sense amplifier 10 may sense data stored in the memory cell array 12 in response to a command/address CA indicating read, amplify a voltage corresponding to the sensed data, and provide the amplified voltage to the I/O buffer 15. For example, the sense amplifier 10 may sense data stored in a targeted memory cell based on the signals WLACT, WREN, and PRCG received from the control logic 11, amplify the sensed voltage, and outputs the amplified voltage to the I/O buffer 15. The sense amplifier 10 may store a signal provided from the I/O buffer 15 in response to a command/address CA indicating writing in a targeted memory cell in the memory cell array 12 under the control of the control logic 11.

The input/output buffer 15 may provide an output of the sense amplifier 10 to the outside during a read operation. The input/output gate 61 may output data provided from the outside to the sense amplifier 10 during a write operation.

Figure 2:
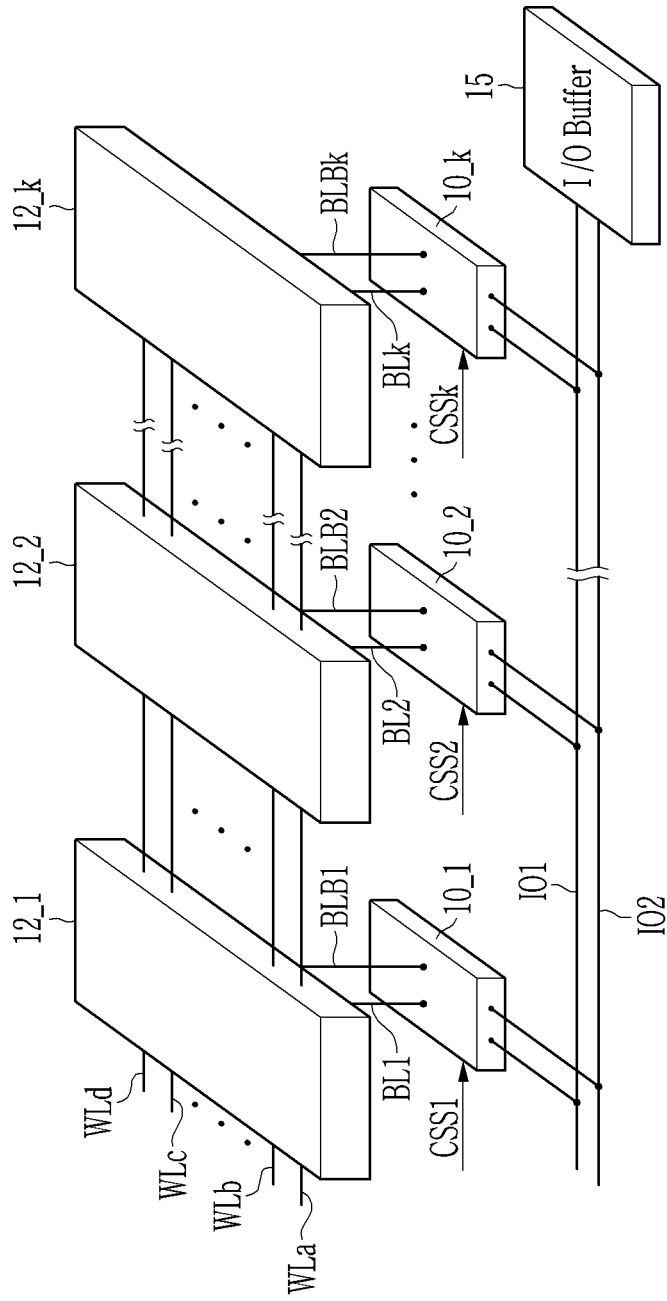
FIG. 2 is a block diagram illustrating a configuration of a sense amplifier and a memory cell array according to the exemplary embodiment illustrated in FIG. 1.

FIG. 2 is a block diagram illustrating configurations of a sense amplifier and a memory cell array according to the exemplary embodiment illustrated in FIG. 1.

As illustrated in FIG. 2, the sense amplifier 10 may include a plurality of sense amplification circuits 10_1 to 10_k, and each of the plurality of sense amplification circuits 10_1 to 10_k is connected to a corresponding bitline (one of BL1 to BLk) and a corresponding complementary bitline (one of BLB1 to BLBk), and sense data of the targeted memory cell or store data in the targeted memory cell through the corresponding bitline and complementary bitline. For ease of disclosure, the bitlines BL1 to BLk may be referred to generically as the bitlines BL and the complementary bitlines BLB1 to BLBk may be referred to generically as the complementary bitlines BLB.

The memory cell array 12 may include a plurality of sub-memory cell arrays 12_1 to 12_k, and each of the plurality of sub-memory cell arrays 12_1 to 12_k may include a plurality of memory cells connected to a corresponding bitline (one of BL1 to BLk), a corresponding complementary bitline (one of BLB1 to BLBk), and a plurality of word lines WLa, WLb, . . . , WLc, and WLd.

Each of the plurality of sense amplification circuits 10_1 to 10_k may be connected to the input/output buffer 15 according to each of the plurality of column selection signals CSS1 to CSSk provided through each of the plurality of column selection lines CSL. For example, when the column selection signal CSS1 is at an on level, the sense amplification circuit 10_1 may be connected to the input/output buffer 15 through the input/output wiring IO1 and IO2 to output the sensed data to the input/output buffer 15 or receive the data to be written from the input/output buffer 15.

Figure 3:
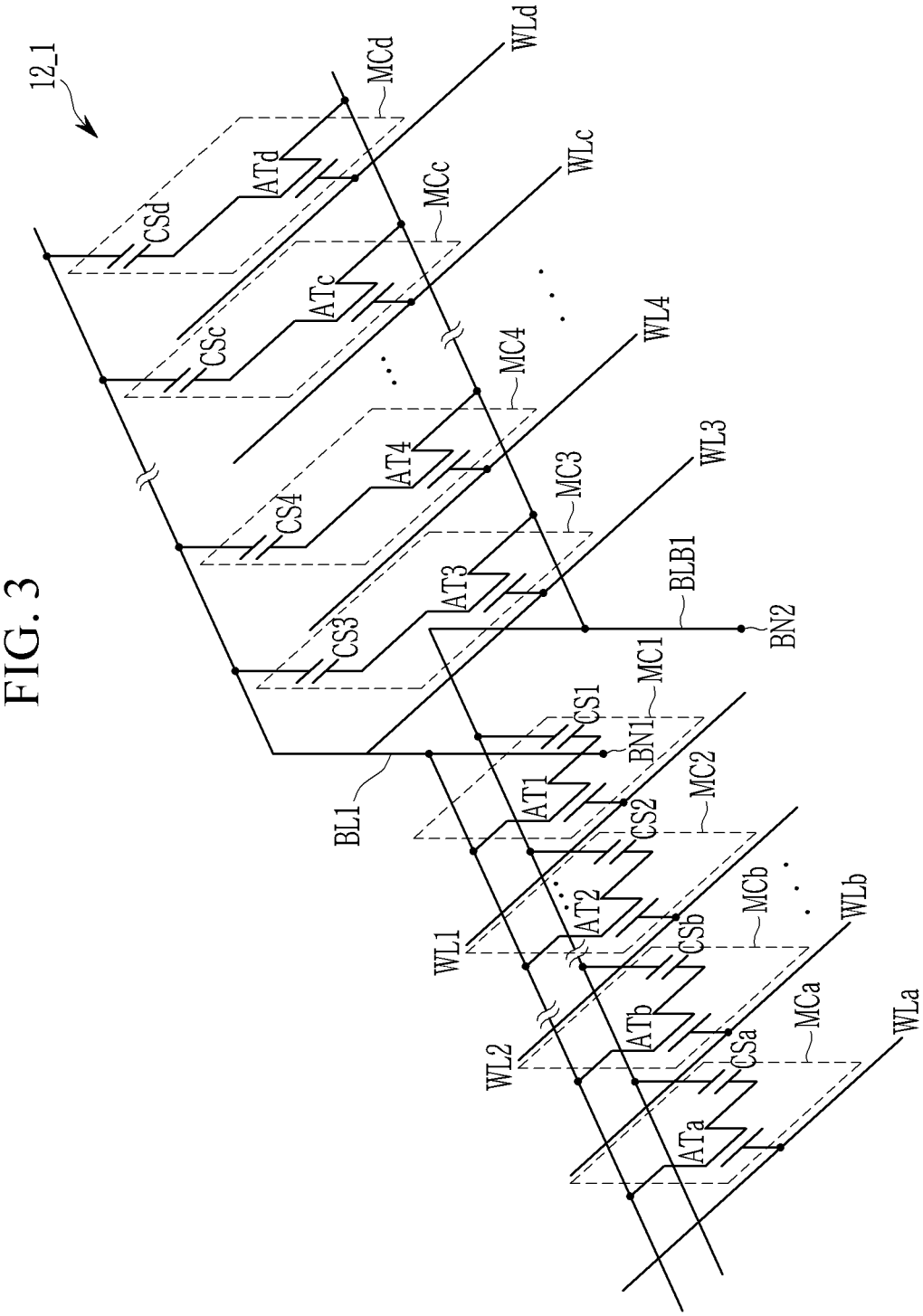
FIG. 3 is a circuit diagram illustrating one of a plurality of sub-memory cell arrays according to the exemplary embodiment illustrated in FIG. 1.

FIG. 3 is a circuit diagram illustrating one of the plurality of sub-memory cell arrays according to the exemplary embodiment illustrated in FIG. 1.

FIG. 3 shows an open bitline structure in which a bitline (BL1) and a complementary bitline (BLB1) are extended in opposite directions from the sense amplification circuits 10_1 (as shown in FIG. 2), but the present disclosure is not limited thereto. The present design may also be applied to a folded bitline structure in which a bitline and a complementary bitline extend in the same direction from the sense amplification circuits 10_1 (as may be seen in FIG. 2).

As illustrated in FIG. 3, the sub-memory cell array 12_1 includes a plurality of first memory cells MC1, MC2, . . . , MCb, and MCa and a plurality of second memory cells MC3, MC4, . . . , MCc, and MCd. Each of the plurality of first memory cells MC1, MC2, . . . , MCb, and MCa may include an access transistor (one of AT1, AT2, . . . , ATb, and ATa) and a capacitor (one of CS1, CS2, . . . , CSb, and CSa), and each of the plurality of second memory cells MC3, MC4, . . . , MCc, and MCd may include an access transistor (one of AT3, AT4, . . . , ATc, and ATd) and a capacitor (one of CS3, CS4, . . . , CSc, and CSd). The plurality of first memory cells MC1, MC2, . . . , MCb, and MCa may be connected to the plurality of word lines WL1, WL2, . . . , WLb, and WLa, respectively, to perform memory operations, such as reading data and writing data, according to word signals provided through the connected word lines. The plurality of second memory cells MC3, MC4, . . . , MCc, and MCd may be connected to the plurality of word lines WL3, WL4, . . . , WLc, and WLd, respectively, to perform memory operations such as reading data and writing data, according to word signals provided through the connected word lines.

In the first memory cell MC1, which is one of the plurality of first memory cells MC1, MC2, . . . , MCb, and MCa, a gate of the access transistor AT1 is connected to the word line WL1, one end of the access transistor AT1 is connected to the bitline BL1, the other end of the access transistor AT1 is connected to one end of the capacitor CS1, and the other end of the capacitor CS1 is connected to the complementary bitline BLB1. Each of the plurality of first memory cells MC2, . . . , MCb, and MCa includes the same configuration as the first memory cell MC1, with only the difference in the word lines WL2, . . . , WLb, and WLa connected to the gates of the corresponding access transistors.

In the second memory cell MC3, which is one of a plurality of second memory cells MC3, MC4, . . . , MCc, and MCd, the gate of the access transistor AT3 is connected to the word line WL3, and one end of the access transistor AT3 is connected to the complementary bitline BLB1, the other end of the access transistor AT3 is connected to one end of the capacitor CS3, and the other end of the capacitor CS3 is connected to the bitline BL1. Each of the plurality of second memory cells MC4, . . . , MCc, and MCd includes the same configuration as the second memory cell MC3, with only the difference in the word lines WL4, . . . , WLc, and WLd connected to the gates of the corresponding access transistors. When the access transistor AT3 is turned on by an on-level word signal applied through the word line WL3, the signal provided through the bitline BL3 is written to the capacitor CS3, so that the predetermined data may be stored in the second memory cell MC3, or the data stored in the capacitor CS3 may be provided to the sense amplification circuit 10_1 through the complementary bitline BLB1.

The bitline BL1 may be connected to the sense amplification circuit 10_1 at a contact point BN1, and the complementary bitline BLB1 may be connected to the sense amplification circuit 10_1 at a contact point BN2. When the access transistor AT1 is turned on by an on-level word signal applied through the word line WL1, the signal provided through the bitline BL1 is written to the capacitor CS1, so that the predetermined data may be stored in the first memory cell MC1, or the data stored in the capacitor CS1 may be provided to the sense amplification circuit 10_1 through the bitline BL1. When the access transistor AT3 is turned on by an on-level word signal applied through the word line WL3, the signal provided through the complementary bitline BLB1 is written to the capacitor CS3, so that the predetermined data may be stored in the second memory cell MC3, or the data stored in the capacitor CS3 may be provided to the sense amplification circuit 10_1 through the complementary bitline BLB1.

Figure 4:
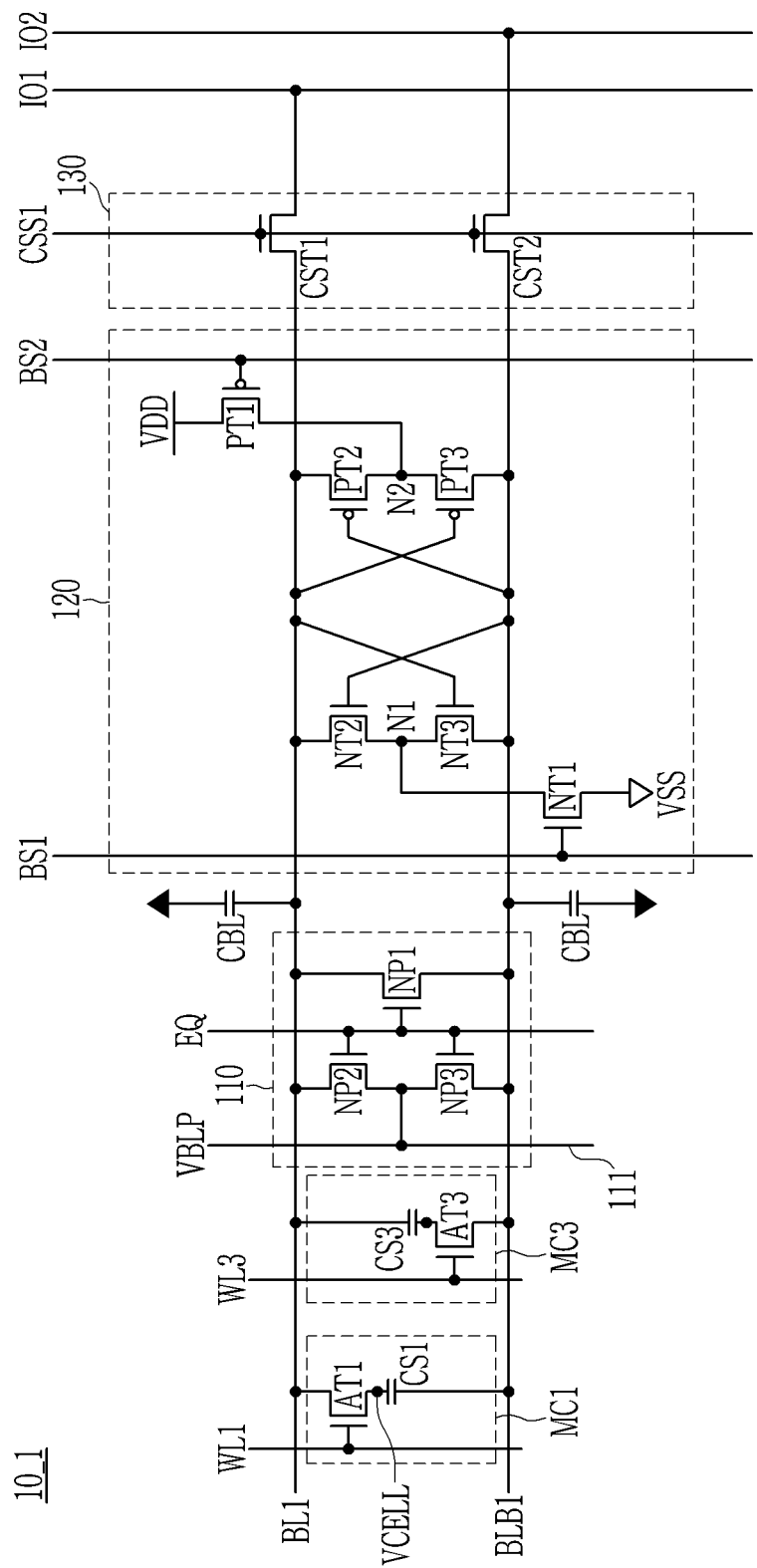
FIG. 4 is a circuit diagram illustrating a sense amplification circuit according to the exemplary embodiment illustrated in FIG. 1.

FIG. 4 is a circuit diagram illustrating the sense amplification circuit according to the exemplary embodiment illustrated in FIG. 1.

In FIG. 4, only two memory cells MC1, MC3 are illustrated, which are necessary to describe the configuration and the operation of the sense amplification circuit 10_1. Although not illustrated in FIG. 4, each of the plurality of first memory cells MC2, . . . , MCb, and MCa is connected to the sense amplification circuit 10_1 like the first memory cell MC1, and each of the plurality of second memory cells MC4, . . . , MCc, and MCd is connected to the sense amplification circuit 10_1 like the second memory cell MC3. After the word line corresponding to the targeted memory cell is activated, the bitline BL1 and the complementary bitline BLB1 may be developed by the sense amplification circuit 10_1.

In FIG. 4, the capacitor formed for each of bitline BL1 and complementary bitline BLB1 is indicated by "CBL". Hereinafter, the capacitance of the bitline BL1 and the capacitance of the complementary bitline BLB1 in the sub-memory cell array 10_1 will be described as being the same. There may be a difference in capacitance between the bitline BL1 and the complementary bitline BLB1, but the difference may be small enough to be negligible.

The sense amplification circuit 10_1 may include a precharge circuit 110, a bitline amplifier 120, and a switching circuit 130 connected between the bitline BL1 and the complementary bitline BLB1.

The precharge circuit 110 may precharge the bitline BL1 and the complementary bitline BLB1 with a precharge voltage VBLP in response to the precharge signal EQ. The precharge voltage VBLP may be supplied through a precharge voltage line 111. The precharge circuit 110 may equalize the voltage of the bitline BL1 and the complementary bitline BLB1 to a predetermined precharge voltage before the sense amplification circuit 10_1 senses and amplifies the data of the targeted memory cell. The control logic 11 may receive a precharge command from an external device and, in response to the precharge command, the control logic 11 may drive the precharge circuit 110 to precharge the bitline BL1 and the complementary bitline BLB1 with a precharge voltage.

The precharge circuit 110 may include a plurality of transistors NP1, NP2, and NP3. A precharge signal EQ is applied to the gates of the plurality of transistors NP1, NP2, and NP3, and the transistor NP1 is connected between the bitline BL1 and the complementary bitline BLB1, one end of the transistor NP2 is connected to the bitline BL1, one end of the transistor NP3 is connected to the complementary bitline BLB1, and the other end of the transistor NP2 and the other end of the transistor NP3 are connected to each other. When the plurality of transistors NP1, NP2, and NP3 is turned on by the precharge signal EQ at an on level (for example, high level), a precharge voltage VBLP supplied through the precharge voltage line 111 may be supplied to the bitline BL1 and the complementary bitline BLB1 through the two transistors NP2, NP3, respectively. Then, each of the bitline BL1 and the complementary bitline BLB1 is precharged with the precharge voltage VBLP. The precharge voltage VBLP may be ½ of the power supply voltage (VDD/2), but the invention is not limited to this.

The bitline amplifier 120 may operate in response to a first bitline sense signal BS1 and a second bitline sense signal BS2, and provide the input/output buffer 15 with an output obtained by sensing and amplifying the data stored in the targeted memory cell among the plurality of connected first memory cells MC1, MC2, . . . , MCb, and MCa and the plurality of connected second memory cells MC3, MC4, . . . , MCc, and MCd. The bitline amplifier 120 may include a plurality of NMOS transistors NT1 to NT3 and a plurality of PMOS transistors PT1 to PT3.

A source of the transistor PT1 is supplied with the power supply voltage VDD, a gate of the transistor PT1 is supplied with the second bitline sense signal BS2, and a drain of the transistor PT1 is connected to a node N2. One end of the transistor PT2 and the one end of the transistor PT3 are connected to each other at the node N2. The other end of the transistor PT2 is connected to the bitline BL1, and the gate of the transistor PT2 is connected to the complementary bitline BLB1. The other end of the transistor PT3 is connected to the complementary bitline BLB1, and the gate of the transistor PT3 is connected to the bitline BL1.

The source of the transistor NT1 is supplied with the power supply voltage VSS, the gate of the transistor NT1 is supplied with the first bitline sense signal BS1, and the drain of the transistor NT1 is connected to a node N1. One end of the transistor NT2 and the one end of the transistor NT3 are connected to each other at the node N1. The other end of the transistor NT2 is connected to the bitline BL1, and the gate of the transistor NT2 is connected to the complementary bitline BLB1. The other end of the transistor NT3 is connected to the complementary bitline BLB1, and the gate of the transistor NT3 is connected to the bitline BL1. The power supply voltage VSS may be the ground voltage. The power supply voltage VDD may be a higher voltage than the power supply voltage VSS.

The switching circuit 130 may include two transistors CST1 and CST2 that are switched by a column selection signal CSS1. The control logic 11 may control the column decoder 14 to turn on the transistors CST1 and CST2 corresponding to the bitline and the complementary bitline connected to the targeted memory cells in response to a command/address CA received from an external device. The column decoder 14 may generate a column selection signal CL1 under the control of the control logic 11 and provide the generated column selection signal CL1 to the switching circuit 130.

One end of the transistor CST1 is connected to the bitline BL1, the other end of the transistor CST1 is connected to an input/output wire IO1 connected to the input/output buffer 15, and the gate of the transistor CST1 may be supplied with the column selection signal CSS1. One end of the transistor CST2 is connected to the complementary bitline BLB1, the other end of the transistor CST2 is connected to an input/output wire IO2 connected to the input/output buffer 15, and the gate of the transistor CST2 may be supplied with the column selection signal CSS1. For example, the on level, a high level, of the column selection signal CSS1 may turn on the two transistors CST1 and CST2, so that the voltages of the bitline BL1 and the complementary bitline BLB1 may be provided to the input/output buffer 15. The voltage difference between the bitline BL1 and the complementary bitline BLB1 is a voltage corresponding to data in the targeted memory cell that is sensed and amplified by the sense amplification circuit 120, and the corresponding voltage difference may be provided to the input/output buffer 15 through the two input/output wires IO1 and IO2.

When the first bitline sense signal BS1 and the second bitline sense signal BS2 are at the on level, a low-level voltage VSS may be supplied to the node N1 through the on-state transistor NT1, and a high-level voltage VDD may be supplied to the node N2 through the on-state transistor PT1. Hereinafter, the operation of the bitline amplifier 120 when the first bitline sense signal BS1 and the second bitline sense signal BS2 are at the on level will be described.

When a voltage corresponding to data 1 is provided from the first memory cell MC1 to the bitline BL1, the voltage of the bitline BL1 may be increased. In this case, the voltage of the complementary bitline BLB1 may be a precharge voltage VBPL. Then, the complementary bitline BLB1 is connected to the power supply voltage VSS through the transistor NT3, to decrease the voltage of the complementary bitline BLB1. In addition, the bitline BL1 is connected to the power supply voltage VDD through the transistor PT2, to increase the voltage of the bitline BL1. In this way, the voltage difference of the positive polarity between the bitline BL1 and the complementary bitline BLB1 is increased, and the corresponding voltage difference may be provided to the input/output buffer 15 through the two transistors CST1 and CST2 that are in the on-state and the two input/output wires IO1 and IO2.

When a voltage corresponding to data 0 is provided from the first memory cell MC1 to the bitline BL1, the voltage of the bitline BL1 may be decreased. In this case, the voltage of the complementary bitline BLB1 may be a precharge voltage VBPL. Then, the bitline BL1 may be connected to the power supply voltage VSS through the transistor NT2, so that the voltage of the bitline BL1 may be decreased. In addition, the complementary bitline BLB1 is connected to the power supply voltage VDD through the transistor PT3, so that the voltage of the complementary bitline BLB1 may be increased. In this way, the voltage difference of the negative polarity between the bitline BL1 and the complementary bitline BLB1 is increased, and the corresponding voltage difference may be provided to the input/output buffer 15 through the two transistors CST1 and CST2 that are in the on-state and the two input/output wires IO1 and IO2.

When a voltage corresponding to data 1 is provided from the second memory cell MC3 to the complementary bitline BLB1, the voltage on the complementary bitline BLB1 may be increased. In this case, the voltage of the bitline BL1 may be a precharge voltage VBPL. Then, the bitline BL1 may be connected to the power supply voltage VSS through the transistor NT2, so that the voltage of the bitline BL1 may be decreased. In addition, the complementary bitline BLB1 is connected to the power supply voltage VDD through the transistor PT3, so that the voltage of the complementary bitline BLB1 may be increased. In this way, the voltage difference of the negative polarity between the bitline BL1 and the complementary bitline BLB1 is increased, and the corresponding voltage difference may be provided to the input/output buffer 15 through the two transistors CST1 and CST2 that are in the on-state and the two input/output wires IO1 and IO2.

When a voltage corresponding to data 0 is provided from the second memory cell MC3 to the complementary bitline BLB1, the voltage of the complementary bitline BLB1 may be decreased. In this case, the voltage of the bitline BL1 may be a precharge voltage VBPL. Then, the complementary bitline BLB1 may be connected to the power supply voltage VSS through the transistor NT3, so that the voltage of the complementary bitline BLB1 may be decreased. In addition, the bitline BL1 is connected to the power supply voltage VDD through the transistor PT2, so that the voltage of the bitline BL1 may be increased. In this way, the voltage difference of the positive polarity between the bitline BL1 and the complementary bitline BLB1 is increased, and the corresponding voltage difference may be provided to the input/output buffer 15 through the two transistors CST1 and CST2 that are in the on-state and the two input/output wires IO1 and IO2.

As such, when the data stored in the first memory cell MC1 is 1, or the data stored in the second memory cell MC3 is 0, the voltage difference (hereinafter, the sense voltage) provided to the input/output buffer 15 through the two input/output wires IO1 and IO2 may be positive polarity. When the data stored in the first memory cell MC1 is 0, or the data stored in the second memory cell MC3 is 1, the sense voltage provided to the input/output buffer 15 through the two input/output wires IO1 and IO2 may be negative polarity. However, the polarity characterization of the sense voltage is just one example; the polarity may be reversed in alternate embodiments.

Using the sense amplification operation of the bitline amplifier 120, the signals sensed and amplified by each of the bitline BL1 and the complementary bitline BLB1 may be written back into the corresponding memory cells MC1 and MC3 during the restore period. During the restore period, the access transistors AT1 and AT3 may be in an on-state by a word signal.

Data 1 or 0 is written to the first memory cell MC1 by the sense amplification circuit 10_1, and the cell voltage VCELL after the write operation may be bootstrapped by the precharge operation. The cell voltage VCELL may be the voltage of a contact point in the first memory cell MC1 where the capacitor CS1 and the access transistor AT1 are connected. In FIG. 4, the power supply voltage VSS may be the ground voltage VGND and the precharge voltage VBLP may be at the VDD/2 level. Then, when the written data is '1', the first memory cell MC1 may be written with a cell voltage VCELL as shown in Equation 1, and when the written data is '0', the first memory cell MC1 may be written with a cell voltage VCELL as shown in Equation 2.

$$\text{VCELL}(\text{DATA}:1) = \text{V}DD + (\text{V}BLP - \text{V}GND) = 1.5\text{V}DD \quad \text{[Equation 1]}$$

$$\text{VCELL}(\text{DATA}:0) = -\text{V}DD + (\text{V}BLP - \text{V}GND) = -0.5\text{V}DD \quad \text{[Equation 2]}$$

Specifically, when data 1 is written to the first memory cell MC1, the transistors CST1 and CST2 are turned on by the column select signal CSS1, a voltage of a level corresponding to data 1 (for example, a VDD voltage) may be supplied through the input/output wire IO1, and a ground voltage may be supplied through the input/output wiring IO2. In this case, the access transistor AT1 is in the on-state. Then, the capacitor CS1 may be charged to the VDD voltage. Then, when the access transistor AT1 is turned off and the bitline BL1 and the complementary bitline BLB1 are charged with the precharge voltage VBLP by the precharge circuit 110, the voltage of the complementary bitline BLB1 may be increased, and the cell voltage VCELL may be increased by the precharge voltage VBLP by the bootstrap. When data 0 is written, the transistors CST1 and CST2 are turned on by the column select signal CSS1, a voltage of a level corresponding to data 0 (for example, a ground voltage) may be supplied through the input/output wire IO1, and the VDD voltage may be supplied through the input/output wiring IO2. In this case, the access transistor AT1 is in the on-state. Then, the capacitor CS1 may be charged with the −VDD voltage. Subsequently, when the access transistor AT1 is turned off and the bitline BL1 and the complementary bitline BLB1 are charged with the precharge voltage VBLP by the precharge circuit 110, the voltage of the complementary bitline BLB1 may be increased, and the cell voltage VCELL may be increased by the precharge voltage VBLP by the bootstrap.

Figure 5:
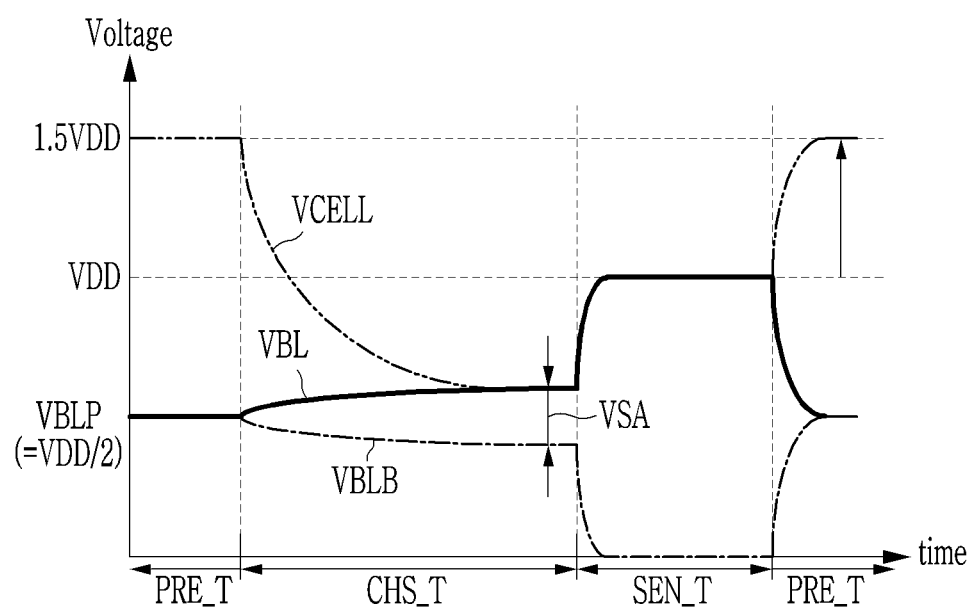
FIG. 5 is a waveform diagram illustrating bitline, complementary bitline, and memory cell voltages according to the exemplary embodiment illustrated in FIG. 1.

Referring to FIG. 5, the generation of the sense voltage in a data read operation will be described.

FIG. 5 is a waveform diagram illustrating bitline, complementary bitline, and memory cell voltages according to the exemplary embodiment illustrated in FIG. 1.

The memory cell voltage illustrated in FIG. 5 may be the cell voltage VCELL of the first memory cell MC1 in FIG. 4. In addition, FIG. 5 shows the waveforms when the data written in the first memory cell MC1 is 1.

When the sense amplification circuit 10_1 reads the data written in the first memory cell MC1, a precharge operation may be performed first. As illustrated in FIG. 5, in the precharge period PRE_T, the bitline BL1 and the complementary bitline BLB1 are supplied with a precharge voltage VBLP by the precharge circuit 110, and the bitline BL1 and the complementary bitline BLB1 may be charged with the precharge voltage VBLP. In this case, the cell voltage VCELL may be 1.5 VDD. In the charge sharing period CHS_T when the access transistor AT1 is in an on-state, the voltage VBL of the bitline BL1 may be increased and the cell voltage VELL and the voltage VBLB of the complementary bitline BLB1 may be decreased while the charge charged on the capacitor CS1 is shared with the bitline BL1. Charge sharing may be performed until the cell voltage VCELL and the voltage of the bitline BL1 are at the same level. Charge sharing allows the voltage VBL of the bitline BL1 to increase as shown in Equation 3 and the voltage VBLB of the complementary bitline BLB1 to decrease as shown in Equation 4.

$$\Delta VBL = VDD * CS1/(CBL + 2CS1) \quad \text{[Equation 3]}$$

$$\Delta VBLB = -VDD * CS1/(CBL + 2CS1) \quad \text{[Equation 4]}$$

In Equations 3 and 4, CS1 may refer to the capacitance of the capacitor CS1, and CBL may refer to the capacitance of the bitline BL1 and the complementary bitline BLB1.

As illustrated in FIG. 5, the sense voltage VSA, which is the voltage difference between the bitline BL1 and the complementary bitline BLB1, is the difference between Equations 3 and 4 and is therefore equal to Equation 5.

$$VSA = 2 * VDD * CS1/(CBL + 2CS1) \quad \text{[Equation 5]}$$

This may be a voltage close to four times the sense voltage in the sense amplification circuit in the related art. The voltage difference between the bitline BL1 and the complementary bitline BLB1 is increased, and the amount of charge stored by the first memory cell MC1 is increased, and at the time of charge sharing, the voltages at both ends of the capacitor CS1 of the first memory cell MC1 are driven by a differential signal to provide a Miller effect such that the capacitance of the capacitor CS1 is increased. Through this, a sense voltage VSA close to four times the sense voltage of the related art may be provided. There may be provided an effect in that as the sense voltage VSA increases, the size of the capacitor CS1 may be reduced compared to the related art, or the retention time may be increased.

The bitline amplifier 120 may operate according to the sense voltage VSA to turn on the transistor NT3 and the transistor PT2. Then, during a sense period SEN_T when the transistor NT1 and the transistor PT1 are turned on, the voltage VBL of the bitline BL1 may be increased to the voltage VDD and be maintained, and the voltage VBLB of the complementary bitline BLB1 may fall to the ground level and be maintained. During the on-period of the transistors CST1 and CST2 during the sense period SEN_T, the voltage VBL and the voltage VBLB may be provided to the input/output buffer 15 through the input/output wires IO1 and IO2. During the sense period SEN_T, the access transistor AT1 is turned on for a predetermined period, and during the restore period, the voltage VDD corresponding to data 1 may be stored in the first memory cell MC1.

After the end of the sense period SEN_T, during the precharge period PRE_T, the voltage VBL of the bitline BL1 and the voltage VBLB of the complementary bitline BLB1 may be changed with the precharge voltage VBLP, and the cell voltage VCELL may be bootstrapped as the voltage VBLB of the complementary bitline BLB1 is increased from the ground level with the precharge voltage VBLP. Then, the cell voltage VCELL may be increased from the VDD level to the 1.5 VDD level.

When the data written in the first memory cell MC1 is 0, the waveforms illustrated in FIG. 5 may be inverted with respect with the precharge voltage VBLP.

Figure 6:
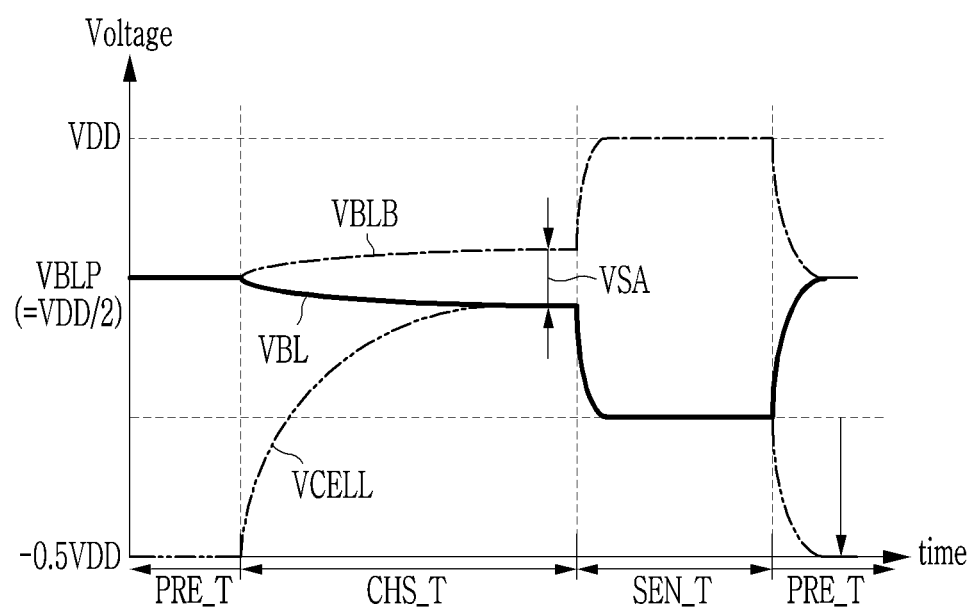
FIG. 6 is a waveform diagram illustrating bitline, complementary bitline, and memory cell voltages according to the exemplary embodiment illustrated in FIG. 1.

FIG. 6 is a waveform diagram illustrating bitline, complementary bitline, and memory cell voltages according to the exemplary embodiment illustrated in FIG. 1.

FIG. 6 is a waveform diagram when the data written in the first memory cell (MC1) is 0. In the precharge period PRE_T, the bitline BL1 and the complementary bitline BLB1 may be supplied with the precharge voltage VBLP by the precharge circuit 110, and the bitline BL1 and the complementary bitline BLB1 may be charged with the precharge voltage VBLP. In this case, the cell voltage VCELL may be −0.5 VDD. In the charge sharing period CHS_T when the access transistor AT1 is in the on-state, the voltage VBL of the bitline BL1 may be decreased and the cell voltage VCELL and the voltage VBLB of the complementary bitline BLB1 may be increased while the charge charged in the capacitor CS1 is shared with the bitline BL1. Charge sharing may be performed until the cell voltage VCELL and the voltage of the bitline BL1 are at the same level. Charge sharing allows the voltage VBL of the bitline BL1 to be decreased by Equation 6 and the voltage VBLB of the complementary bitline BLB1 to be increased by Equation 7.

$$\Delta VBL = -VDD * CS1/(CBL + 2CS1) \quad \text{[Equation 6]}$$

$$\Delta VBLB = VDD * CS1/(CBL + 2CS1) \quad \text{[Equation 7]}$$

In Equations 6 and 7, CS1 may refer to the capacitance of the capacitor CS1, and CBL may refer to the capacitance of the bitline BL1 and the complementary bitline BLB1.

As illustrated in FIG. 6, the sense voltage VSA, which is the voltage difference between the bitline BL1 and the complementary bitline BLB1, is the difference between Equations 6 and 7 and is therefore equal to Equation 8.

$$VSA = 2*VDD*CS1/(CBL + 2CS1) \qquad \text{[Equation 8]}$$

The bitline amplifier 120 may operate according to the sense voltage VSA to turn on the transistor NT2 and the transistor PT3. Then, during the sense period SEN_T when the transistor NT1 and the transistor PT1 are turned on, the voltage VBL of the bitline BL1 may be decreased to the ground level and be maintained, and the voltage VBLB of the complementary bitline BLB1 may be increased to the voltage VDD and be maintained. During the on-period of the transistors CST1 and CST2 during the sense period SEN_T, the voltage VBL and the voltage VBLB may be provided to the input/output buffer 15 through the input/output wires IO1 and IO2. During the sense period SEN_T, the access transistor AT1 is turned on for a predetermined period, and during the restore period, the voltage of the ground level corresponding to data 0 may be stored in the first memory cell MC1.

After the end of the sense period SEN_T, during the precharge period PRE_T, the voltage VBL of the bitline BL1 and the voltage VBLB of the complementary bitline BLB1 may be changed with the precharge voltage VBLP, and the cell voltage VCELL may be bootstrapped as the voltage of the complementary bitline BLB1 is decreased from the voltage VDD with the precharge voltage VBLP. Then, the cell voltage VCELL may be decreased from the ground level to the −0.5 VDD level.

Figure 7:
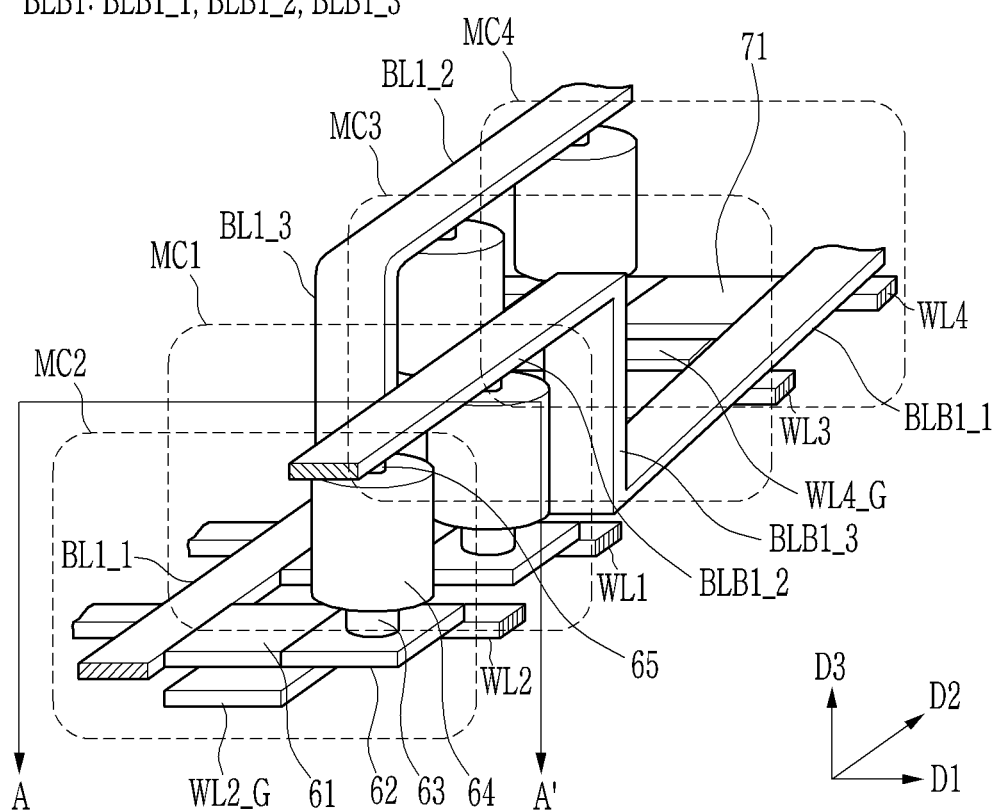
FIG. 7 is a perspective view illustrating a portion of the memory cell array according to an exemplary embodiment.

FIG. 7 is a perspective view illustrating a portion of the memory cell array according to an exemplary embodiment.

FIG. 7 is an example to illustrate the structure of a memory cell, a bitline connected to the memory cell, and a complementary bitline connected to the memory cell, implemented according to an exemplary embodiment, but the invention is not limited thereto. Additionally, there are many ways to implement a memory cell array based on the structure illustrated in FIG. 7. The insulating layers are not illustrated in FIG. 7 to better illustrate the structure of the configurations of the embodiment, but the insulating layers may be located in the spaces between the configurations illustrated in FIG. 7.

In FIG. 7, the bitline BL1 may include a first region BL1_1 extending in a second direction D2 to be connected to a plurality of first memory cells MC1 and MC2, a second region BL1_2 extending in the second direction D2 to be connected to the capacitors of a plurality of second memory cells MC3 and MC4, and a third region BL1_3 extending in a third direction D3 to connect the first region BL1_1 and the second region BL1_2. The complementary bitline BLB1 may include a first region BLB1_1 extending in the second direction D2 to be connected to the plurality of second memory cells MC3 and MC4, a second region BLB1_2 extending in the second direction D2 to be connected to the capacitors of the plurality of first memory cells MC1 and MC2, and a third region BLB1_3 extending in the third direction D3 to connect the first region BLB1_1 and the second region BLB1_2.

The bitline BL1 may be formed on the same layer as the semiconductor layer (for example, reference numeral 61 in FIG. 7) configuring the access transistors of the first memory cells MC1 and MC2 and connected to the semiconductor layer. The complementary bitline BLB1 may be formed on the same layer as the semiconductor layer (for example, reference numeral 71 in FIG. 7) of the second memory cells MC3 and MC4 and connected to the semiconductor layer. However, unlike that illustrated in FIG. 7, the bitline BL1 and the complementary bitline BLB1 may be formed in a layer different from the semiconductor layer and connected through via contacts.

The semiconductor layers of the plurality of first and second memory cells MC1 to MC4 according to the embodiment may be formed of an oxide semiconductor. That is, the access transistors of the plurality of first and second memory cells MC1 to MC4 may include an oxide semiconductor. The oxide semiconductor may include at least one of a primary metal oxide, such as indium (In) oxide, tin (Sn) oxide, or zinc (Zn) oxide, a binary metal oxide, such as In—Zn-based oxides, Sn—Zn-based oxides, Al—Zn-based oxides, Zn—Mg-based oxides, Sn—Mg-based oxides, In—Mg-based oxides, or In—Ga-based oxides, a ternary metal oxide, such as In—Ga—Zn-based oxide, In—Al—Zn-based oxide, In—Sn—Zn-based oxide, Sn—Ga—Zn-based oxide, Al—Ga—Zn-based oxide, Sn—Al—Zn-based oxide, In—Hf—Zn-based oxide, In—La—Zn-based oxide, In—Ce—Zn-based oxide, In—Pr—Zn-based oxide, In—Nd—Zn-based oxide, In—Sm—Zn-based oxide, In—Eu—Zn-based oxide, In—Gd—Zn-based oxide, In—Tb—Zn-based oxide, In—Dy—Zn-based oxide, In—Ho—Zn-based oxide, In—Er—Zn-based oxide, In—Tm—Zn-based oxide, In—Yb—Zn-based oxide, or In—Lu—Zn-based oxide, and a quaternary metal oxide, such as In—Sn—Ga—Zn-based oxide, In—Hf—Ga—Zn-based oxide, In—Al—Ga—Zn-based oxide, In—Sn—Al—Zn-based oxide, In—Sn—Hf—Zn-based oxide, or In—Hf—Al—Zn based oxide. For example, the semiconductor layers 61 and 71 may include Indium-Gallium-Zinc Oxide (IGZO) among the In—Ga—Zn-based oxides. Oxide semiconductors do not require a doping process to form channels, so the problem does not occur in the oxide semiconductor that the parasitic capacitance between the source/drain layer and the substrate is increased by the doping process for channel formation in the silicon semiconductor. In addition, the oxide semiconductor has less leakage current than the silicon semiconductor, so it is possible to maintain a cell voltage increased by bootstrapping. Even if one electrode of the capacitor is connected to a bitline or a complementary bitline and bootstrapped by a precharge voltage, the bootstrapped voltage cannot be maintained because the leakage current of the silicon semiconductor is relatively large compared to that of the oxide semiconductor. In the exemplary embodiment, the cell voltage may be bootstrapped to increase a sense voltage, which is a voltage difference between a bitline and a complementary bitline, and the bootstrapped cell voltage may be maintained.

Each of the plurality of word lines WL1 and WL2 may include a gate layer (for example, WL2_G) extending in the first direction D1, located under the layer in which the first memory cells MC1 and MC2 are formed in the third direction D3, and extending in the second direction D2 to overlap the semiconductor layer 61 in the third direction. Each of the plurality of word lines WL3 and WL4 may include a gate layer (for example, WL4_G) extending in the first direction D1, located under the layer in which the second memory cells MC3 and MC4 are formed in the third direction D3, and extending in the second direction D2 to overlap the semiconductor layer 71 in the third direction.

The first memory cell MC1 and the first memory cell MC2 may have the same structure with only difference in the corresponding word lines. The description of the first memory cell MC2 may be applied to the first memory cell MC1.

The semiconductor layer 61 and the source/drain layer 62 of the first memory cell MC2 are located on the same layer, and the source/drain layer 62 may be directly connected to the semiconductor layer 61. In the following description, "source/drain layer" means that it can be either a source layer or a drain layer. In the upper portion of the source/drain layer 62, a second electrode 63 of a capacitor may be formed and located. The complementary bitline BLB1 may be connected to a first electrode 64 of the capacitor through an electrode 65. Although the second electrode 63 and the first electrode 64 are illustrated in FIG. 7 in the shape of a column, this is an example to illustrate the electrode of the capacitor and the invention is not limited thereto.

Figure 8:
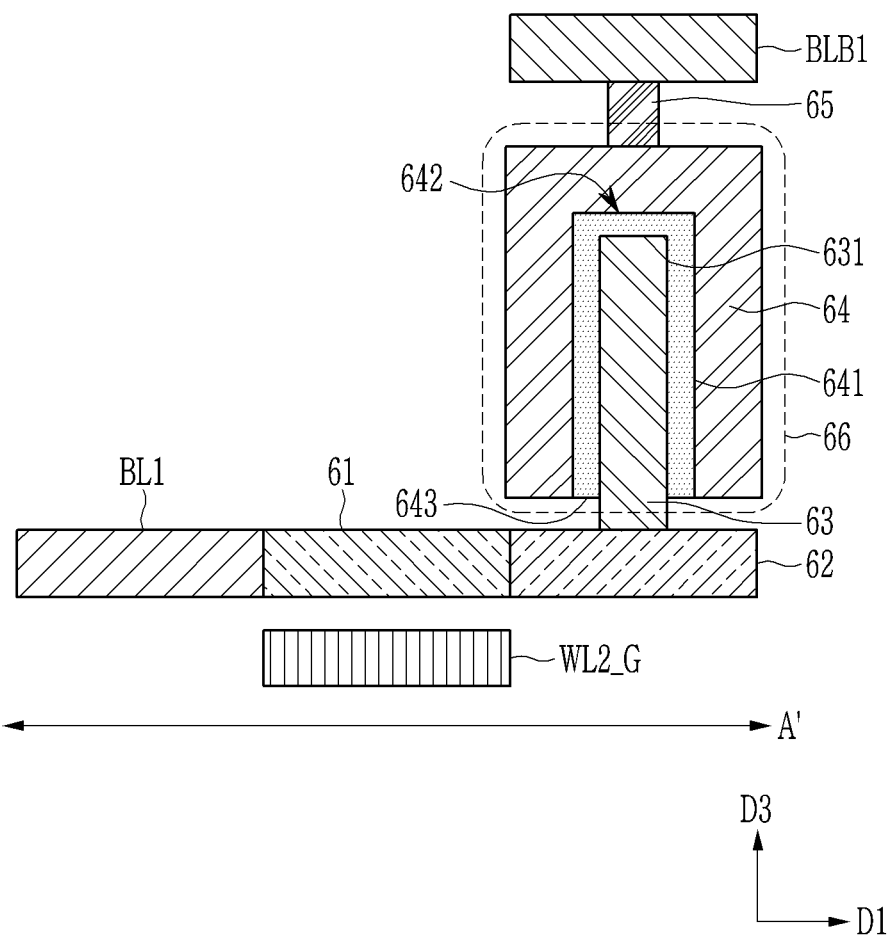
FIG. 8 is a cross-sectional diagram illustrating a cross-sectional image taken along line A-A' in FIG. 7.

FIG. 8 is a cross-sectional diagram illustrating a cross-sectional image taken along A-A' in FIG. 7.

As illustrated in FIG. 8, the capacitor 66 may include two electrodes 63, 64 and a dielectric layer 643. The first electrode 64 is connected to the complementary bitline BLB1 through the electrode 65, and the second electrode 63 is connected to the source/drain 63. The second electrode 63 may be implemented as a pillar structure, a columnar structure, or the like, formed by extending in the third direction D3 on the source/drain 63. The first electrode 64 may include a recess 642 formed to allow the second electrode 63 to be located inside the first electrode 64. The first electrode 64 illustrated in FIG. 8 is an example of a concave shape (H) in which the second electrode 63 may be located within the recess 642 of the first electrode 64, but the invention is not limited thereto.

As illustrated in FIG. 8, the second electrode 63 may be located within the recess 642 of the first electrode 64, such that an outer circumferential surface 631 of the second electrode 63 and an inner circumferential surface 641 of the first electrode 64 may be opposite, and a dielectric layer 643 may be formed and located in the space between the inner circumferential surface 641 of the first electrode 64 and the outer circumferential surface 631 of the second electrode 63. In FIG. 8, the second electrode 63 is formed in a column shape, and the recess 642 of the first electrode 64 is also illustrated in a cylindrical shape, but the invention is not limited to thereto. The recess 642 of the first electrode 64 may be implemented in a shape that conforms to the shape of the second electrode 63.

In the second memory cells MC3 and MC4, compared to the first memory cell MC2, a semiconductor layer may be connected to the complementary bitline BLB1 instead of the bitline BL1, and the first electrode of the capacitor may be connected to the bitline BL1 instead of the complementary bitline BLB1. The structure of the second memory cells MC3 and MC4 may be understood based on the contents illustrated in FIGS. 7 and 8.

Unlike the capacitor structure illustrated in FIGS. 7 and 8, an electrode structure connected to the complementary bitline (or bitlines) may be applied to the electrodes connected to the source/drain layer.

Figure 9:
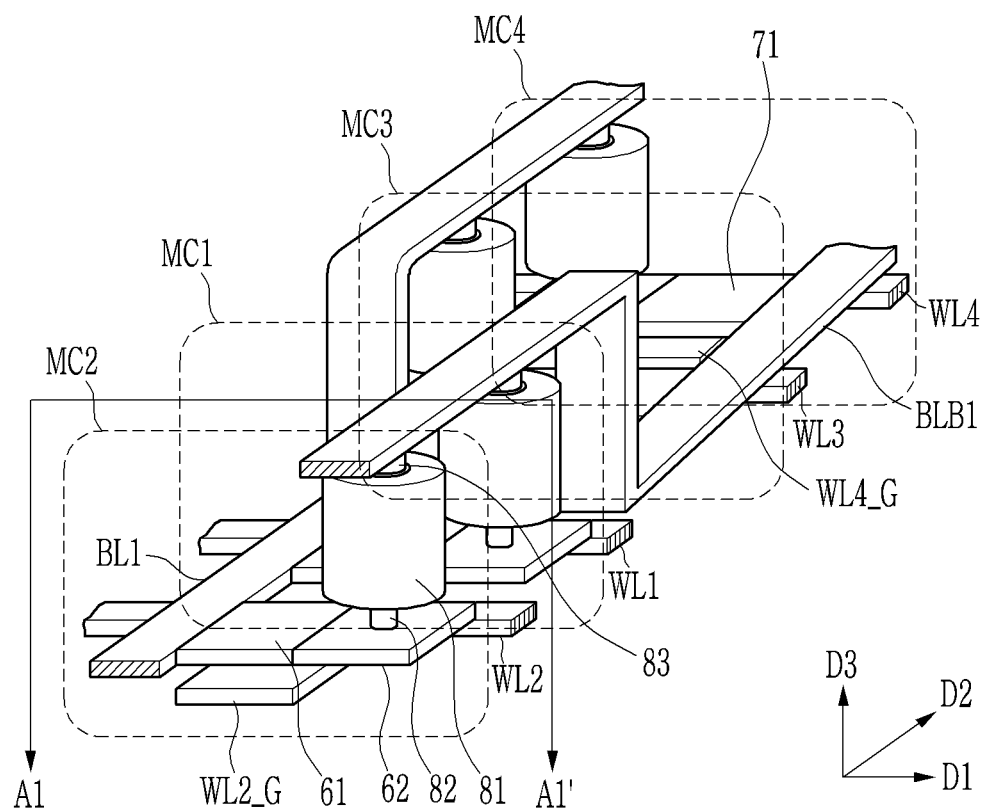
FIG. 9 is a perspective view illustrating a portion of the memory cell array according to an exemplary embodiment.

FIG. 9 is a perspective view illustrating a portion of the memory cell array according to an exemplary embodiment.

Figure 10:
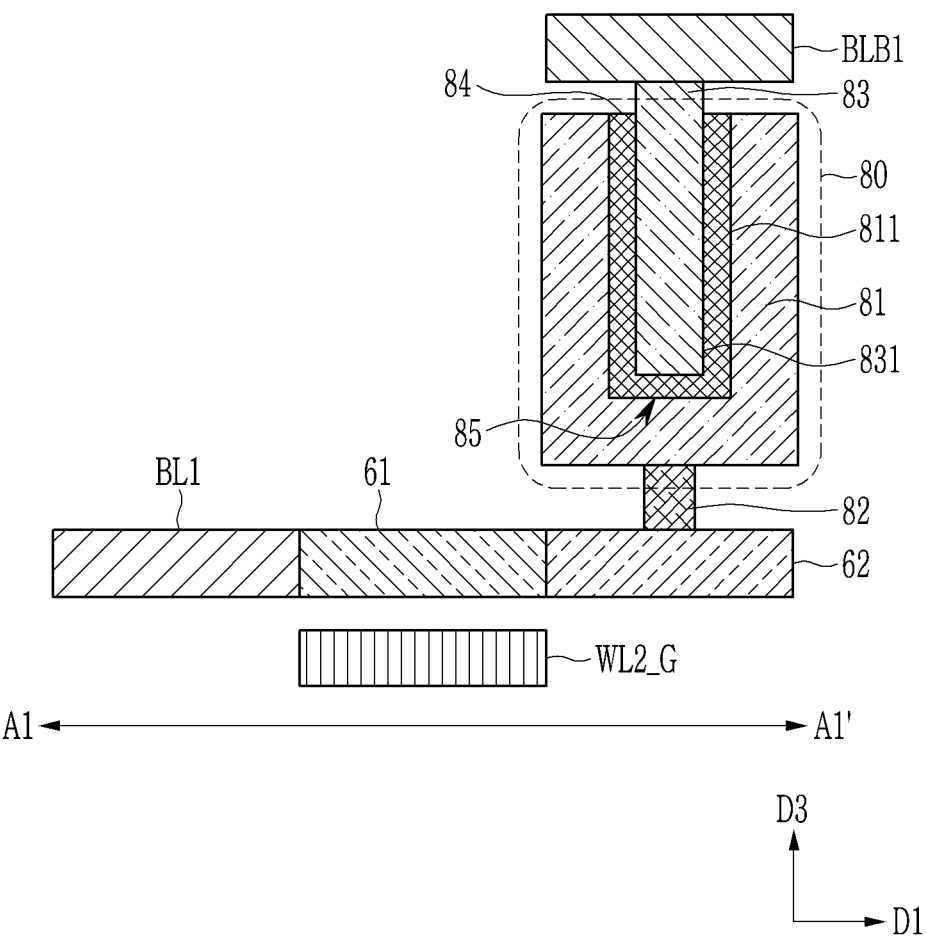
FIG. 10 is a cross-sectional diagram illustrating a cross-sectional image taken along line A1-A1' in FIG. 9.

FIG. 10 is a cross-sectional diagram illustrating a cross-sectional image taken along line A1-A1' in FIG. 9.

For the configurations among the configurations illustrated in FIG. 9 that are identical to the configurations illustrated in FIG. 7, the same reference numerals are used and descriptions of the identical configurations are omitted.

As illustrated in FIGS. 9 and 10, the capacitor 80 may include two electrodes 81 and 83 and a dielectric layer 84. The first electrode 81 is connected to the source/drain 63 through the electrode 82. The second electrode 83 is connected to the complementary bitline BLB1 and may be implemented in a pillar structure, a columnar structure, or the like, formed by extending in the third direction D3 on the complementary bitline BLB1. The first electrode 81 may include a recess 85 formed to allow the second electrode 83 to be located inside the first electrode 81. As illustrated in FIG. 10, the second electrode 83 may be located within the recess 85 of the first electrode 81, such that an outer circumferential surface 831 of the second electrode 83 and an inner circumferential surface 811 of the first electrode 81 may be opposite, and a dielectric layer 84 may be formed and located in the space between the inner circumferential surface 811 of the first electrode 81 and the outer circumferential surface 831 of the second electrode 83. In FIG. 10, the second electrode 83 is formed in a columnar shape, and the recess 84 of the first electrode 81 is also illustrated in a cylindrical shape, but the invention is not limited to this. The recess 85 of the first electrode 81 may be implemented in a shape that conforms to the shape of the second electrode 83.

The memory cell structure according to the embodiment is not limited to the structure illustrated in FIG. 3. The memory cell structure may be varied based on the structure illustrated in FIG. 3. The memory cell array may be implemented in a structure in which one of the plurality of first memory cells MC1, MC2, ..., MCb, and MCa and a corresponding one of the plurality of second memory cells MC3, MC4, ..., MCc, and MCd diagonally face each other. Hereinafter, a memory cell array structure in which a first memory cell and a second memory cell face each other in a diagonal direction according to the embodiment will be described.

Figure 11:
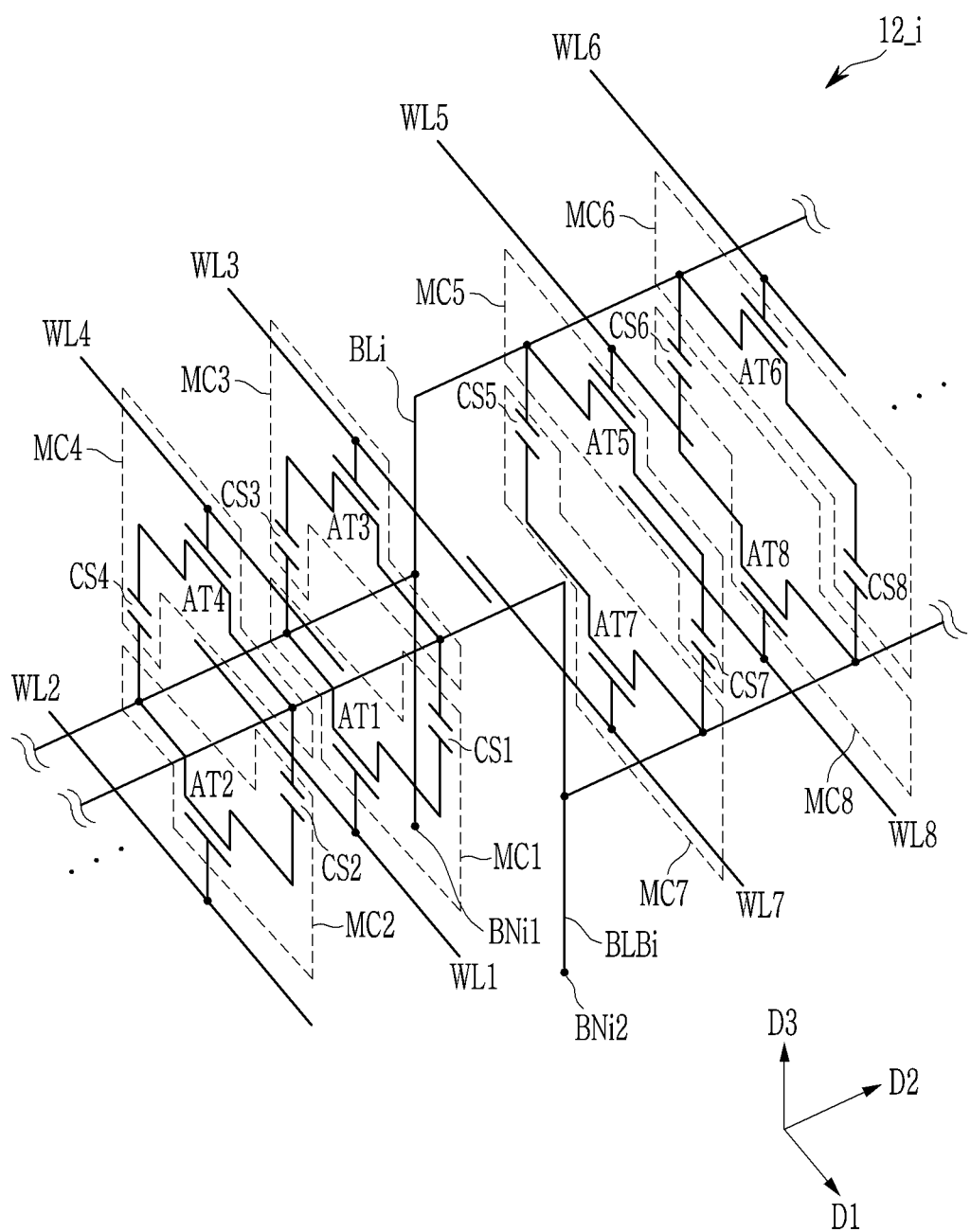
FIG. 11 is a circuit diagram illustrating one of a plurality of sub-memory cell arrays according to an exemplary embodiment.

FIG. 11 is a circuit diagram illustrating one of a plurality of sub-memory cell arrays according to the embodiment.

In FIG. 11, a partial configuration of one sub-memory cell array (12_i, where i is one of an integer from 1 to k) of the plurality of sub-memory cell arrays (12_1 to 12_k) illustrated in FIG. 2 is illustrated. Although eight memory cells are illustrated in FIG. 11, the overall structure of the sub-memory cell array 12_i may be understood based on the contents illustrated in FIG. 11 and the following description.

As illustrated in FIG. 11, the sub-memory cell array 12_i includes a plurality of first memory cells MC1, MC2, MC5, and MC6 and a plurality of second memory cells MC3, MC4, MC7, and MC8. Each of the plurality of first memory cells MC1, MC2, MC5, and MC6 may include a plurality of access transistors AT1, AT2, AT5, and AT6 and a plurality of capacitors CS1, CS2, CS5, and CS6, respectively, and each of the plurality of second memory cells MC3, MC4, MC7, and MC8 may include the plurality of access transistors AT3, AT4, AT7, and AT8 and the plurality of capacitors CS3, CS4, CS7, and CS8, respectively. Each of the plurality of first memory cells MC1, MC2, MC5, and MC6 may be connected to each of the plurality of word lines WL1, WL2, WL5, and WL6, and perform memory operations, such as reading data, writing data, and the like, according to word signals provided through the connected word lines. Each of the plurality of second memory cells MC3, MC4, MC7, and MC8 may be connected to each of the plurality of word lines WL3, WL4, WL7, and WL8, and perform memory operations, such as reading data, writing data, and the like, according to word signals provided through the connected word lines.

In the first memory cell MC1, which is one of the plurality of first memory cells MC1, MC2, MC5, and MC6, a gate of the access transistor AT1 is connected to the word line WL1, and one end of the access transistor AT1 is connected to the bitline BL1, and the other end of the access transistor AT1 is connected to one end of the capacitor CS1, and the other end of the capacitor CS1 is connected to the complementary bitline BLB1. In the second memory cell MC3, which is one of the plurality of first memory cells MC3, MC4, MC7, and MC8, a gate of the access transistor AT3 is connected to the word line WL3, and one end of the access transistor AT3 is connected to the complementary bitline BLB1, and the other end of the access transistor AT3 is connected to one end of the capacitor CS3, and the other end of the capacitor CS3 is connected to the bitline BL1. The access transistor AT1 of the first memory cell MC1 and the access transistor AT3 of the second memory cell MC3 may be located while facing each other in the third direction D3, and the capacitor CS1 of the first memory cell MC1 and the capacitor CS3 of the second memory cell MC3 may be located while facing each other in the second direction D1. The case where the corresponding first and second memory cells face each other in the diagonal direction may mean the case where the two access transistors face each other in the third direction and the two corresponding capacitors face each other in the first direction.

The bitline BLi may be connected to the sense amplification circuit 10_i at a contact point BNi1, and the complementary bitline BLBi may be connected to the sense amplification circuit 10_i at a contact point BNi2. When the access transistor AT1 is turned on by an on-level word signal applied through the word line WL1, the signal provided through the bitline BLi is written to the capacitor CS1, and the predetermined data is stored in the first memory cell MC1, or the data stored in the capacitor CS1 may be provided to the sense amplification circuit 10_i through the bitline BLi. When the access transistor AT3 is turned on by an on-level word signal applied through the word line WL3, the signal provided through the complementary bitline BLBi is written to the capacitor CS3, and the predetermined data is stored in the second memory cell MC3, or the data stored in the capacitor CS3 may be provided to the sense amplification circuit 10_i through the complementary bitline BLBi.

The description of the operation of the memory cell and the operation of the sense amplification circuit in the embodiment of the structure in which the memory cells face in the diagonal direction may be the same as the description previously referred to with reference to FIGS. 4 to 6.

Figure 12:
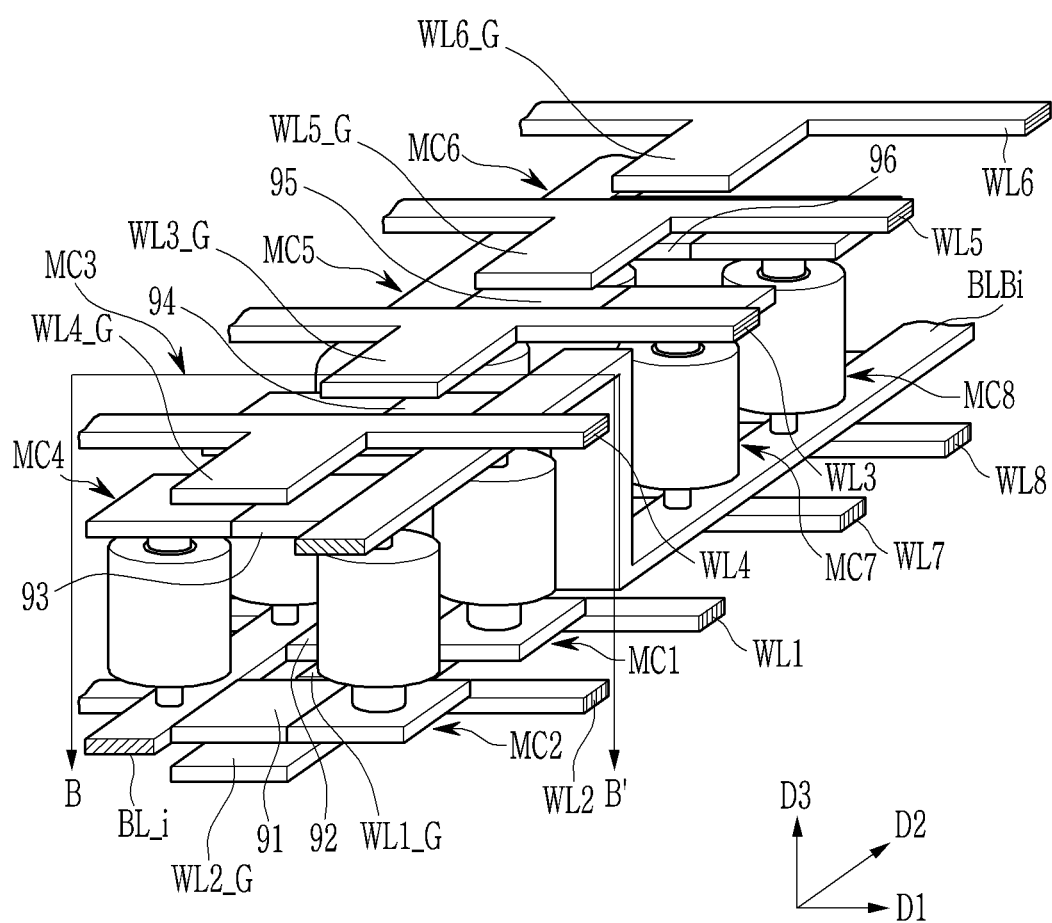
FIG. 12 is a perspective view illustrating a portion of the memory cell array according to the embodiment illustrated in FIG. 11.

FIG. 12 is a perspective view illustrating a portion of the memory cell array according to the embodiment illustrated in FIG. 11.

FIG. 12 is an example to illustrate the structure of a memory cell, a bitline connected to the memory cell, and a complementary bitline connected to the memory cell, implemented according to the embodiment illustrated in FIG. 11, but the invention is not limited thereto. Although the insulating layers are not illustrated in FIG. 12 to better illustrate the structure of the configurations of the embodiment, insulating layers may be located in the spaces between the configurations illustrated in FIG. 12. The semiconductor layers of the plurality of access transistors illustrated in FIG. 12 may be implemented as oxide semiconductors. Any portion of the following description of FIG. 12 that is identical to the description of FIG. 7 may be omitted.

In FIG. 12, each of the plurality of word lines WL1 to WL8 may extend in the first direction D1, and each word line may include a gate layer extending in the second direction D2 such that the word line overlaps in the third direction D3 on the semiconductor layer of the corresponding access transistor. For example, the word line WL2 corresponding to the first memory cell MC2 may include a gate layer WL2_G located under the layer in which the first memory cell MC2 is formed and extending in the second direction D2 to overlap the semiconductor layer 91 of the first memory cell MC2 in the third direction D3. The word line WL1 corresponding to the first memory cell MC1 may include a gate layer WL1_G located under the layer in which the first memory cell MC1 is formed and extending in the second direction D2 to overlap the semiconductor layer 92 of the first memory cell MC1 in the third direction D3. The word line WL4 corresponding to the second memory cell MC4 may include a gate layer WL4_G located above the layer in which the second memory cell MC4 is formed and extending in the second direction D2 to overlap the semiconductor layer 93 of the second memory cell MC4 in the third direction D3. The word line WL3 corresponding to the second memory cell MC3 may include a gate layer WL3_G located above the layer in which the second memory cell MC3 is formed and extending in the second direction D2 to overlap the semiconductor layer 94 of the second memory cell MC3 in the third direction D3.

The word line WL5 corresponding to the first memory cell MC5 may include a gate layer WL5_G located above the layer in which the first memory cell MC5 is formed and extending in the second direction D2 to overlap the semiconductor layer 95 of the first memory cell MC5 in the third direction D3. The word line WL6 corresponding to the first memory cell MC6 may include a gate layer WL6_G located above the layer in which the first memory cell MC6 is formed and extending in the second direction D2 to overlap the semiconductor layer 96 of the first memory cell MC6 in the third direction D3. The word line WL7 corresponding to the second memory cell MC7 may include a gate layer located under the layer in which the second memory cell MC7 is formed and extending in the second direction D2 to overlap the semiconductor layer of the second memory cell MC7 in the third direction D3. The word line WL8 corresponding to the second memory cell MC8 may include a gate layer located under the layer in which the second memory cell MC8 is formed and extending in the second direction D2 to overlap the semiconductor layer of the second memory cell MC8 in the third direction D3. Although the semiconductor layers of the second memory cells MC7 and MC8 and the gate layers of the word lines WL7 and WL8 are not illustrated in FIG. 12, they may be obviously understood based on the contents illustrated in FIG. 12 and the above description.

In FIG. 12, the word lines are located above or under the corresponding memory cells, but the invention is not limited to this. The word lines WL1, WL2, WL7, and WL8 may be located above the first memory cell MC1 and MC2 and the second memory cell MC7 and MC8. The word lines WL3, WL4, WL5, and WL6 may be located under the first memory cell MC3, and MC4 and the second memory cell MC5, and MC6. To illustrate the structure of the memory cells, FIG. 13 may be used, in which the word lines WL1 to WL8 illustrated in FIG. 12 have been removed.

Figure 13:
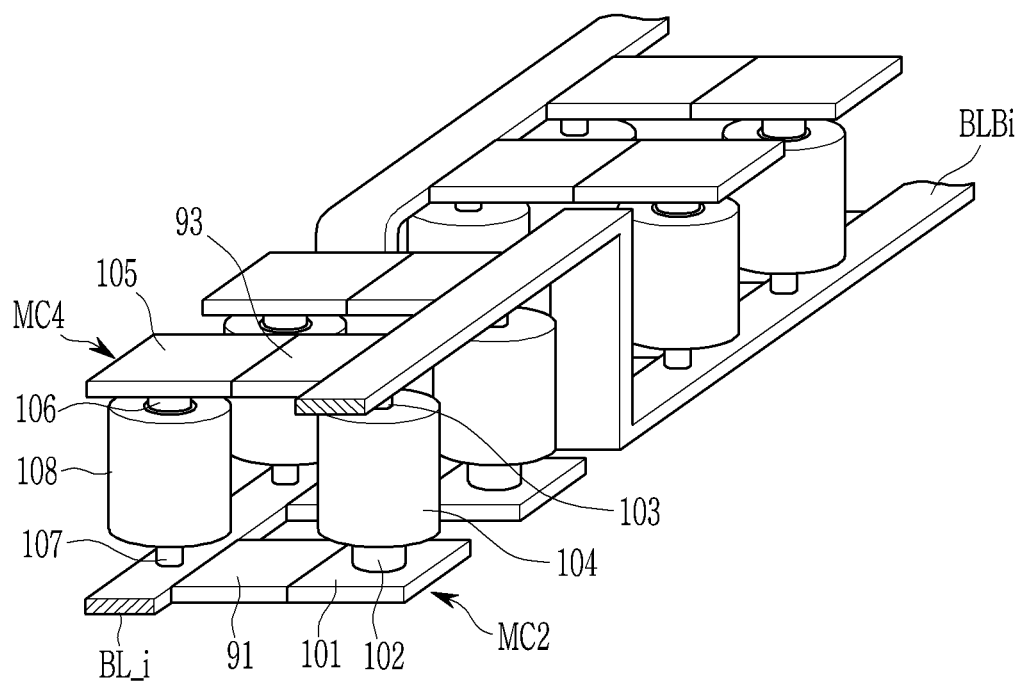
FIG. 13 is a perspective view illustrating a partial structure of the memory cell array in FIG. 12 from which word lines are removed.

FIG. 13 is a perspective view illustrating a partial structure of the memory cell array in FIG. 12 from which the word lines are removed.

As illustrated in FIG. 13, the semiconductor layer 91 and the source/drain layer 101 of the first memory cell MC2 are located on the same layer, and the source/drain layer 101 may be directly connected to the semiconductor layer 91. In the upper portion of the source/drain layer 101, a first electrode 102 of a capacitor may be formed and located. The complementary bitline BLBi may be connected to the second electrode 104 of the capacitor through the electrode 103. The semiconductor layer 93 and the source/drain layer 105 of the second memory cell MC2 are located on the same layer, and the source/drain layer 105 may be directly connected to the semiconductor layer 93. In the lower portion of the source/drain layer 105, a first electrode 106 of a capacitor may be formed and located. The bitline BLi may be connected to the second electrode 108 of the capacitor through the electrode 107. Although the first electrodes 102 and 106 and second electrodes 104 and 108 are illustrated in a columnar shape in FIG. 10, this is an example to illustrate the capacitor electrodes, and the invention is not limited thereto.

Figure 14:
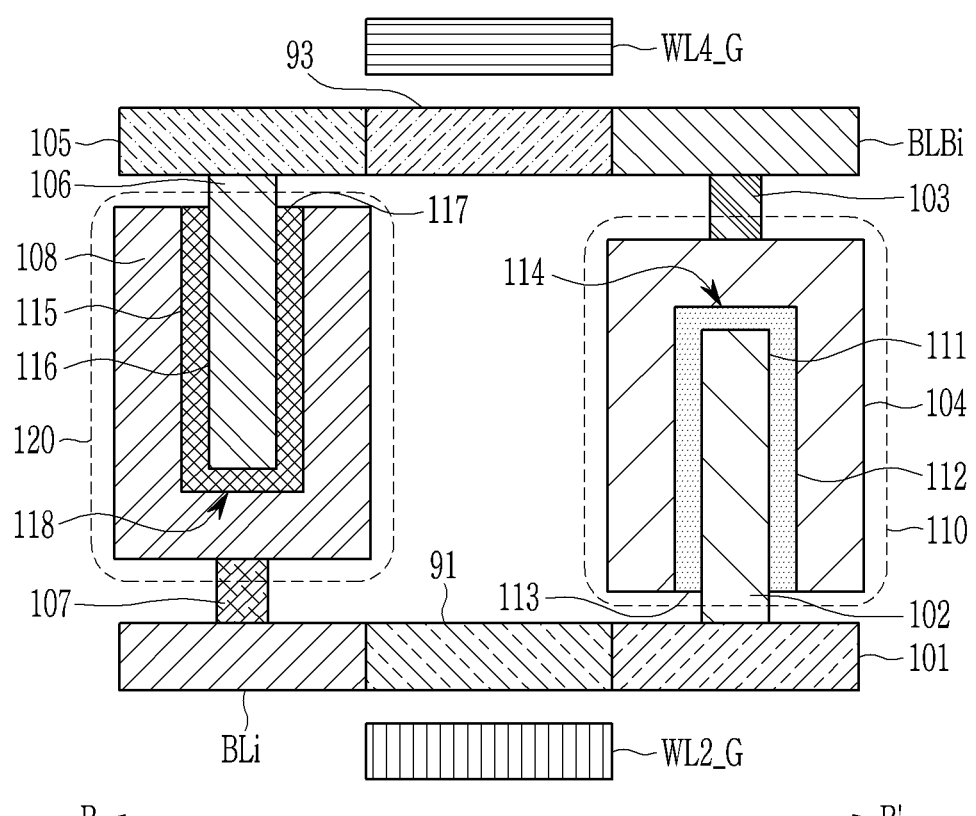
FIG. 14 is a cross-sectional diagram illustrating a cross-sectional image taken along line B-B' in FIG. 12.

FIG. 14 is a cross-sectional diagram illustrating a cross-sectional image taken along line B-B' in FIG. 12.

In FIG. 14, the gate layer WL2_G of the word line WL2 may overlap the semiconductor layer 91 of the first memory cell MC2 in a third direction, and the gate layer WL4_G of the word line WL4 may overlap the semiconductor layer 93 of the second memory cell MC4 in a third direction.

As illustrated in FIG. 14, a capacitor 110 may include a first electrode 104, a second electrode 102, and a dielectric layer 113. The capacitor 110 may be in a configuration corresponding to the capacitor CS4 of the second memory cell MC4. The first electrode 104 is connected to the complementary bitline BLBi through the electrode 103, and the second electrode 102 is connected to the source/drain layer 101. The second electrode 102 may be implemented in a pillar structure, a columnar structure, or the like, formed by extending on the source/drain layer 101 in the third direction D3. The first electrode 104 may include a recess 114 formed to allow the second electrode 102 to be located inside the first electrode 104. As illustrated in FIG. 14, the second electrode 102 may be located within the recess 114 of the first electrode 104, such that an outer circumferential surface 111 of the second electrode 102 and an inner circumferential surface 112 of the first electrode 104 may be opposite, and a dielectric layer 113 may be formed and located in the space between the inner circumferential surface 112 of the first electrode 104 and the outer circumferential surface 111 of the second electrode 102.

The capacitor 120 may include a first electrode 108, a second electrode 106, and a dielectric layer 117. The capacitor 120 may be in a configuration corresponding to the capacitor CS2 of the first memory cell MC2. The first electrode 108 is connected to the bitline BLi through the electrode 107, and the second electrode 106 is connected to the source/drain layer 105. The second electrode 106 may be implemented as a pillar structure, a columnar structure, or the like, formed by extending on the source/drain layer 105 in the third direction D3. The first electrode 108 may include a recess 118 formed to allow the second electrode 106 to be located inside the first electrode 108. As illustrated in FIG. 14, a second electrode 106 may be located within the recess 118 of the first electrode 108, such that an outer circumferential surface 116 of the second electrode 106 and an inner circumferential surface 115 of the first electrode 108 are opposite, and a dielectric layer 117 may be formed in the space between the inner circumferential surface 115 of the first electrode 108 and the outer circumferential surface 116 of the second electrode 106.

In FIG. 14, the second electrodes 102 and 106 are formed in a columnar shape, and the recesses 114 and 118 of the first electrodes 104 and 108 are also illustrated in a cylindrical shape, but the invention is not limited to thereto. The recesses 114 and 118 of the first electrodes 104 and 108 may be implemented in a shape that conforms to the shape of the second electrodes 102 and 106.

Based on the contents illustrated in FIGS. 13 and 14 and the above description, a structure in which the other first memory cells MC1, MC5, and MC6 and the other second memory cells MC3, MC7, and MC8 are located in a diagonal direction may also be understood. In FIGS. 12 to 14, it is illustrated that the shape of the first electrode connected to the bitline or the complementary bitline among the electrodes configuring the capacitor includes the recess, and the second electrode is located in the corresponding recess. However, the invention is not limited thereto, and capacitors may be implemented in other geometries.

Figure 15:
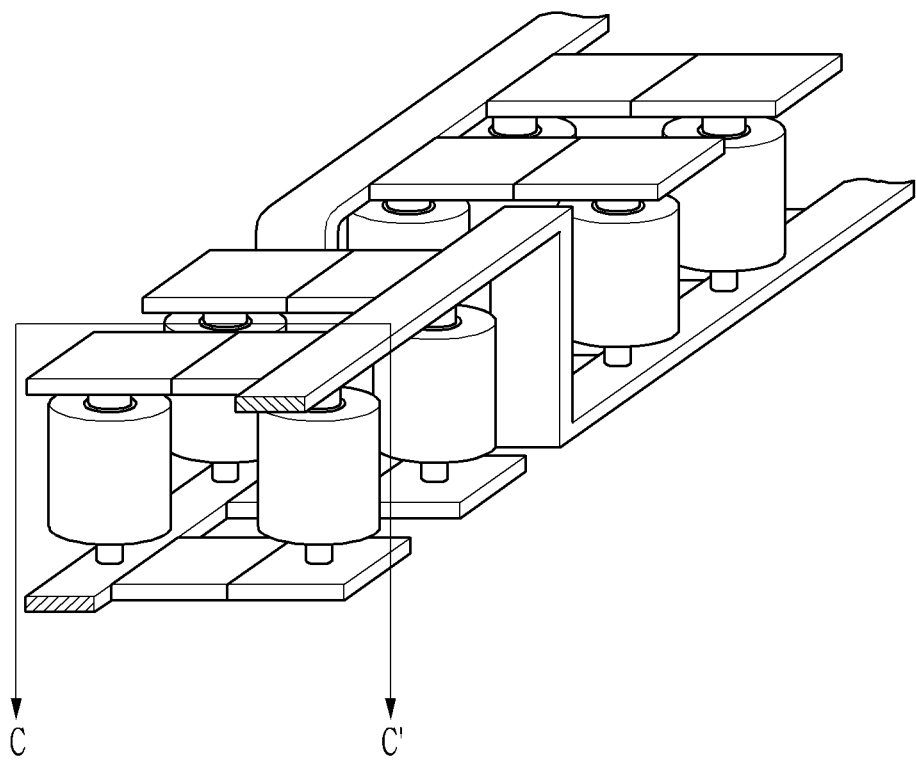
FIG. 15 is a perspective view illustrating a partial structure of the memory cell array according to an exemplary embodiment.

FIG. 15 is a perspective view illustrating a partial structure of the memory cell array according to an exemplary embodiment.

Figure 16:
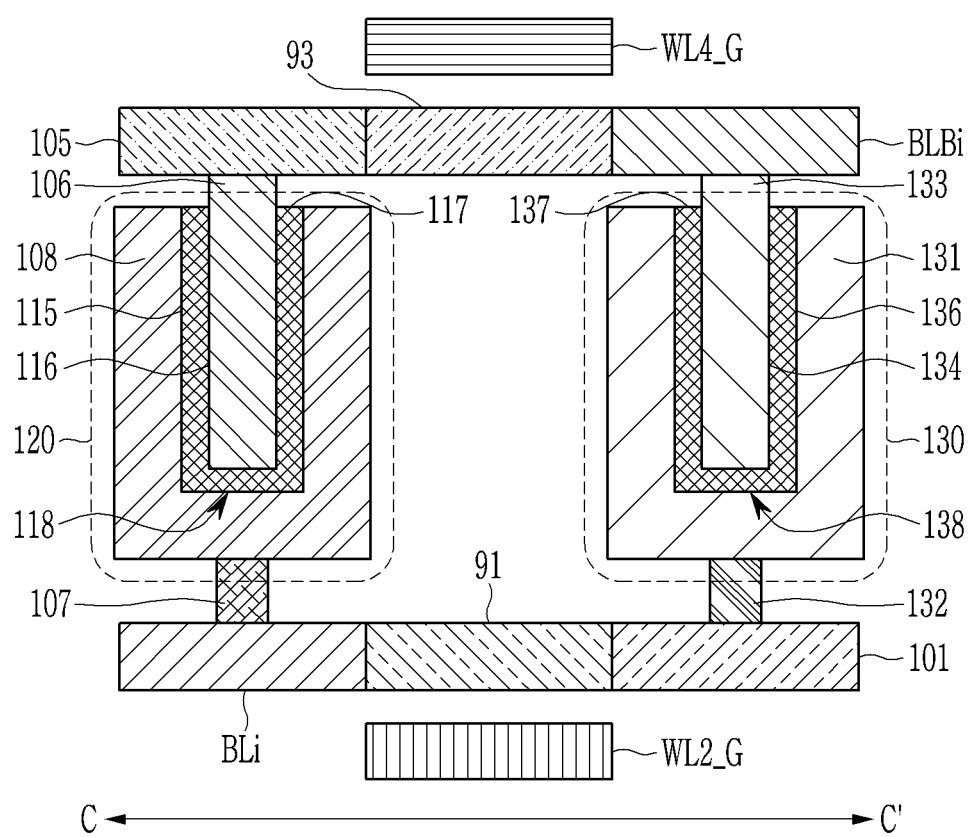
FIG. 16 is a cross-sectional diagram illustrating a cross-sectional image taken along line C-C' of FIG. 15

FIG. 16 is a cross-sectional diagram illustrating a cross-sectional image taken along line C-C' of FIG. 15.

FIG. 15 is a perspective view in which the word lines have been removed as in FIG. 13. While the word lines are not illustrated in the perspective view of FIG. 15, the cross-sectional diagram of FIG. 16 shows the gate layers WL2_G and WL4_G of the word lines WL2 and WL4 in FIG. 12 corresponding to the memory cells MC2 and MC4, respectively. In the cross section of FIG. 16, the same reference numerals are used as in FIG. 14 for configurations identical to those illustrated in FIG. 14. A description of a configuration identical to the configuration illustrated in FIG. 14 is omitted herein.

As illustrated in FIG. 16, the capacitor 130 may include a first electrode 131, a second electrode 133, and a dielectric layer 137. The capacitor 130 may be a configuration corresponding to the capacitor CS4 of the second memory cell MC4. The first electrode 131 is connected to the source/drain layer 101 through the electrode 132. The second electrode 133 is connected to the complementary bitline BLBi and may be implemented as a pillar structure, a columnar structure, or the like, formed by extending in the third direction D3 on the complementary bitline BLBi. The first electrode 131 may include a recess 138 formed to allow the second electrode 132 to be located inside the first electrode 131. As illustrated in FIG. 16, the second electrode 132 may be located within the recess 138 of the first electrode 131, such that an outer circumferential surface 134 of the second electrode 132 and an inner circumferential surface 136 of the first electrode 131 are opposite, and the dielectric layer 137 is formed and located in the space between the inner circumferential surface 136 of the first electrode 131 and the outer circumferential surface 134 of the second electrode 132.

Figure 17:
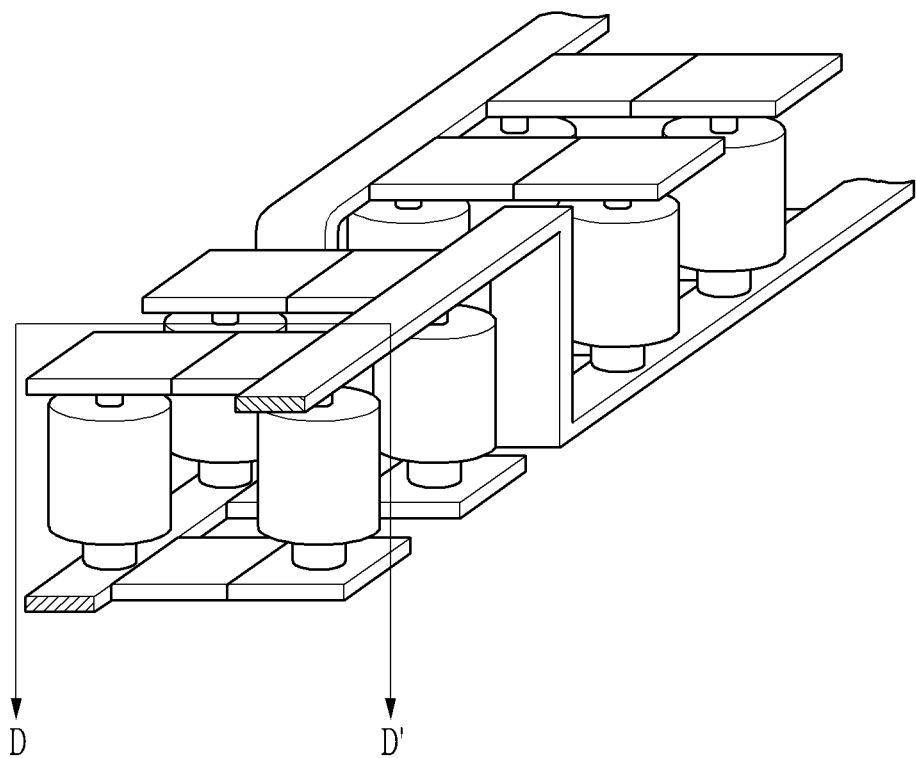
FIG. 17 is a perspective view illustrating a partial structure of the memory cell array according to an exemplary embodiment.

FIG. 17 is a perspective view illustrating a partial structure of the memory cell array according to an exemplary embodiment.

Figure 18:
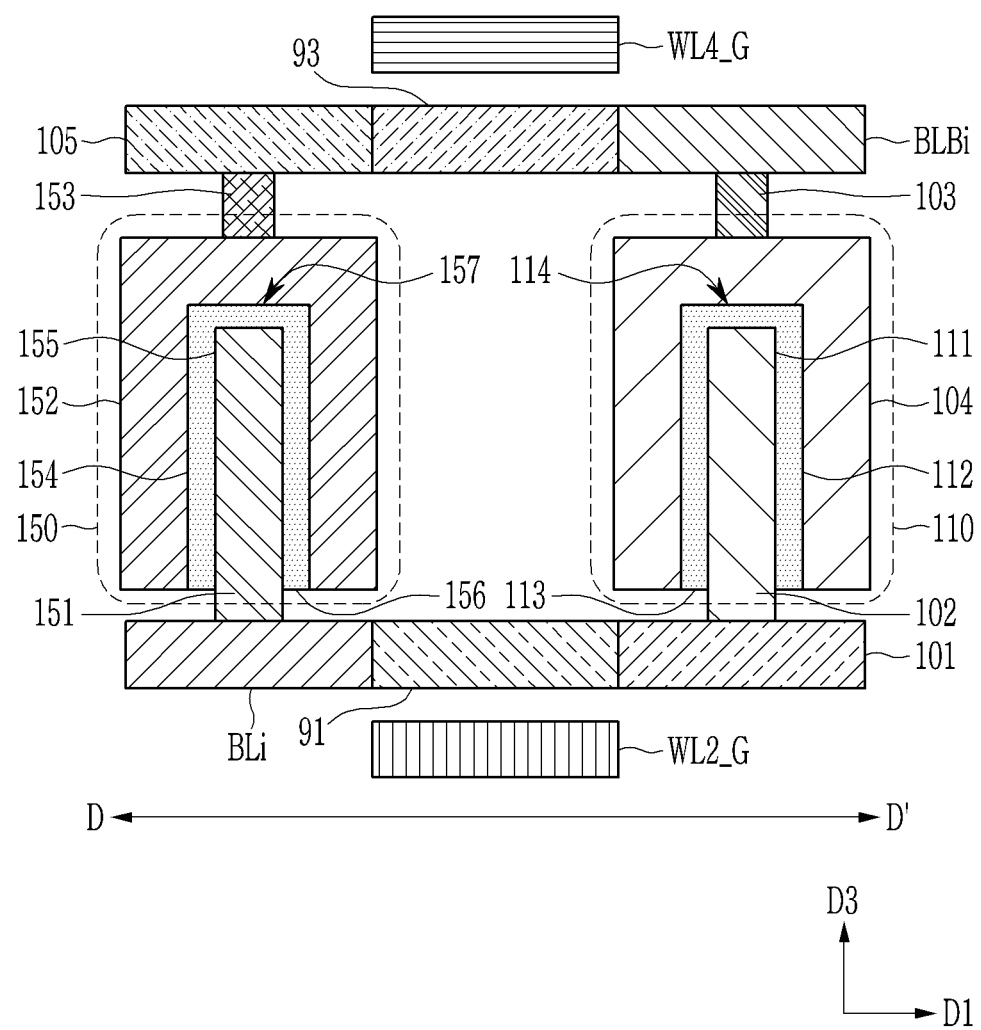
FIG. 18 is a cross-sectional diagram illustrating a cross-sectional image taken along line D-D' of FIG. 17.

FIG. 18 is a cross-sectional diagram illustrating a cross-sectional image taken along D-D' of FIG. 17.

FIG. 17 is a perspective view in which the word lines have been removed as in FIG. 13. The word lines are not illustrated in the perspective view of FIG. 17, but the cross-sectional diagram of FIG. 18 shows the gate layers WL2_G and WL4_G of the word lines (WL2 and WL4 in FIG. 12) corresponding to the memory cells MC2 and MC4, respectively. In the cross section of FIG. 18, the same reference numerals are used as in FIG. 14 for configurations identical to those illustrated in FIG. 14. A description of a configuration identical to the configuration illustrated in FIG. 14 is omitted herein.

As illustrated in FIG. 18, a capacitor 150 may include a first electrode 152, a second electrode 151, and a dielectric layer 156. The capacitor 150 may be a configuration corresponding to the capacitor CS2 of the first memory cell MC2. The first electrode 152 is connected to a source/drain layer 105 through the electrode 153. The second electrode 151 is connected to the bitline BLi and may be implemented as a pillar structure, a columnar structure, or the like, formed by extending on the bitline BLi in the third direction D3. The first electrode 152 may include a recess 157 formed to allow the second electrode 151 to be located in the inside of the first electrode 152. As illustrated in FIG. 18, a second electrode 151 may be located within the recess 157 of the first electrode 152, such that an outer circumferential surface 155 of the second electrode 151 and an inner circumferential surface 154 of the first electrode 152 are opposite, and a dielectric layer 156 is formed and located in the space between the inner circumferential surface 154 of the first electrode 152 and the outer circumferential surface 155 of the second electrode 151.

Figure 19:
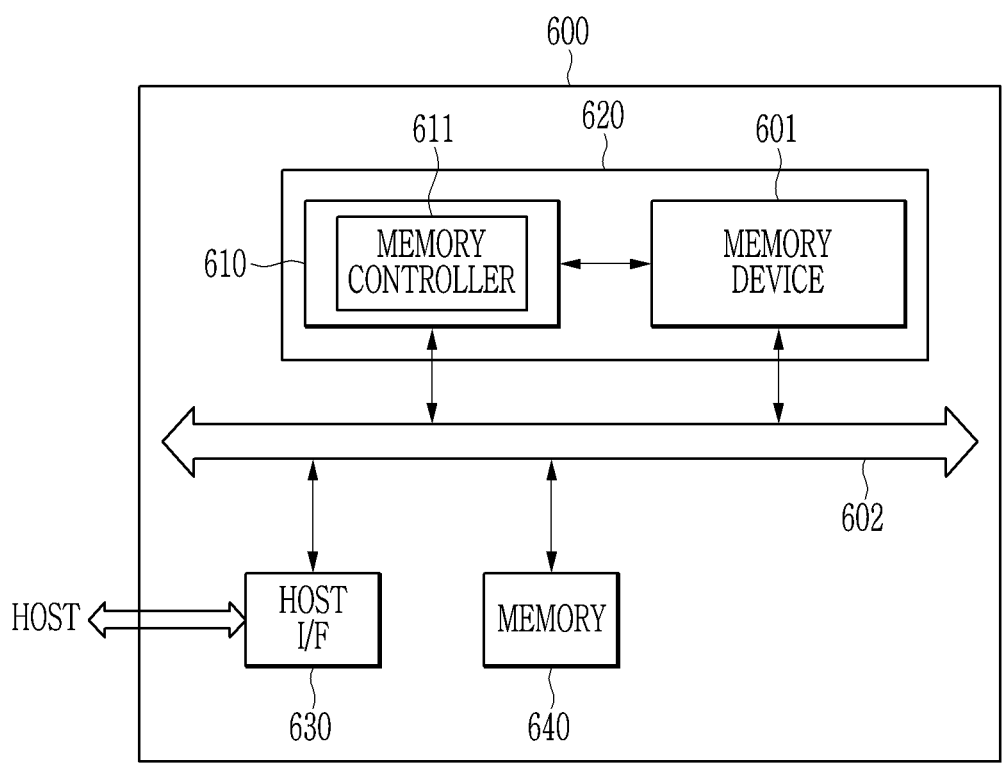
FIG. 19 is a diagram illustrating a system including a memory device according to an exemplary embodiment.

FIG. 19 is a diagram illustrating a system including a memory device, according to an exemplary embodiment.

As illustrated in FIG. 19, the system 600 may include a memory device 601 and a processor 610 that may control the overall operation of the system 600. The memory device 601 may be implemented as the memory device 1 previously described with reference to FIGS. 1 to 18. The system 600 may be implemented as a portable electronic device. For example, the system 600 may be implemented as a flash memory drive, a universal serial bus (USB) memory drive, an IC-USB memory drive, or a memory stick.

According to some embodiments, the memory device 601 and the processor 610 may be packaged as a package 620. The package 620 may be mounted on a system board (not illustrated). The package 620 may be a structure including a plurality of semiconductor devices stacked sequentially on a package substrate. In this case, at least one of the plurality of semiconductor devices may include a memory device 601. The processor 610 may include a memory controller 611 for controlling the operation of the memory device 601. The system 600 may include a memory 640, which may be used as an operation memory for the processor 610. The memory 640 may be implemented as a non-volatile memory or a volatile memory.

A host connected to the system 600 may send and receive data to and from the memory device 601 through the processor 610 and the host interface 630. In this case, the memory controller 611 may perform the functions of a memory interface. The processor 610 may control the exchange of data between the memory device 601, a host interface 630, and the memory 640 through a bus 602.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A memory device, comprising:
a first memory cell connected to a first bitline and a second memory cell connected to a second bitline,
wherein the first memory cell includes:
a first access transistor including one end connected to the first bitline; and
a first capacitor including one electrode connected to another end of the first access transistor and another electrode connected to the second bitline,
wherein the first access transistor includes a semiconductor layer and a gate layer overlapping the semiconductor layer in a vertical direction perpendicular to an upper surface of the semiconductor layer, and
wherein the semiconductor layer includes an oxide semiconductor material.

2. The memory device as claimed in claim 1, wherein:
the another electrode of the first capacitor includes a recess in which the one electrode of the first capacitor is located, and
the first capacitor further includes a dielectric layer located between an inner circumferential surface of the another electrode of the first capacitor and an outer circumferential surface of the one electrode of the first capacitor.

3. The memory device as claimed in claim 1, wherein:
the one electrode of the first capacitor includes a recess in which the another electrode of the first capacitor is located, and
the first capacitor further includes a dielectric layer located between an inner circumferential surface of the one electrode of the first capacitor and an outer circumferential surface of the another electrode of the first capacitor.

4. The memory device as claimed in claim 1, wherein:
the second memory cell includes a second access transistor including one end connected to the second bitline,
a second capacitor including one electrode connected to another end of the second access transistor and another electrode connected to the first bitline, and
the second access transistor includes a semiconductor layer including an oxide semiconductor material.

5. The memory device as claimed in claim 4, wherein:
the another electrode of the second capacitor includes a recess in which the one electrode of the second capacitor is located, and
the second capacitor further includes a dielectric layer located between an inner circumferential surface of the another electrode of the second capacitor and an outer circumferential surface of the one electrode of the second capacitor.

6. The memory device as claimed in claim 4, wherein:
the one electrode of the second capacitor includes a recess in which the another electrode of the second capacitor is located, and
the second capacitor further includes a dielectric layer located between an inner circumferential surface of the one electrode of the second capacitor and an outer circumferential surface of the another electrode of the second capacitor.

7. The memory device as claimed in claim 1, further comprising a sense amplification circuit configured to amplify a sense voltage corresponding to a voltage difference between the first bitline and the second bitline, wherein the sense amplification circuit is configured to precharge the second bitline with a precharge voltage during a precharge period, so that a cell voltage, which is a voltage of the one electrode of the first capacitor, is bootstrapped.

8. The memory device as claimed in claim 7,
wherein when data written to the first memory cell is 1, the cell voltage is increased by a bootstrap voltage, and
the voltage of the first bitline is increased during an on period of the first access transistor after the precharge period.

9. The memory device as claimed in claim 7,
wherein when data written to the first memory cell is 0, the cell voltage is decreased by a bootstrap voltage, and
the voltage of the first bitline is decreased during an on period of the first access transistor after the precharge period.

10. A memory device, comprising:
a first memory cell connected to a first bitline and a second bitline; and
a sense amplification circuit connected to the first bitline and the second bitline, and configured to amplify a sense voltage that is a voltage difference between the first bitline and the second bitline,
wherein the first memory cell includes:
a first access transistor connected to the first bitline; and
a first capacitor connected to the second bitline,
wherein the first access transistor includes a semiconductor layer and a gate layer overlapping the semiconductor layer in a vertical direction perpendicular to an upper surface of the semiconductor layer, and
wherein the semiconductor layer includes an oxide semiconductor material.

11. The memory device as claimed in claim 10, further comprising:
a second memory cell connected to the first bitline and the second bitline,
wherein the second memory cell includes:
a second access transistor connected to the second bitline; and
a second capacitor connected to the first bitline, and
wherein the second access transistor includes a semiconductor layer including an oxide semiconductor material.

12. The memory device as claimed in claim 10,
wherein the sense amplification circuit is configured to precharge the second bitline with a precharge voltage during a precharge period, so that a cell voltage, which is a voltage of one end of the first capacitor, is bootstrapped.

* * * * *